US011331646B2

(12) United States Patent
Lorgouilloux et al.

(10) Patent No.: US 11,331,646 B2
(45) Date of Patent: May 17, 2022

(54) PROCESS FOR MANUFACTURING A SORBENT FOR A FLUE GAS TREATMENT PROCESS, SORBENT AND USE OF SAID SORBENT IN SUCH FLUE GAS TREATMENT PROCESS

(71) Applicant: S.A. Lhoist Recherche et Developpement, Ottignies-Louvain-la-Neuve (BE)

(72) Inventors: Marion Lorgouilloux, Strepy Bracquegnies (BE); Mehdi Maazoun, Rhode Saint Genese (BE); Olivier Nyssen, Ghlin (BE); Heiszwolf Johan, Overrijse (BE)

(73) Assignee: S.A. Lhoist Recherche et Developpement, Ottignies-Louvain-la-Neuve (BE)

( * ) Notice: Subject to any disclaimer, the term of this patent is extended or adjusted under 35 U.S.C. 154(b) by 0 days.

(21) Appl. No.: 16/603,033

(22) PCT Filed: Apr. 6, 2018

(86) PCT No.: PCT/EP2018/058939
§ 371 (c)(1),
(2) Date: Oct. 4, 2019

(87) PCT Pub. No.: WO2018/185328
PCT Pub. Date: Oct. 11, 2018

(65) Prior Publication Data
US 2020/0086293 A1 Mar. 19, 2020

(30) Foreign Application Priority Data
Apr. 7, 2017 (WO) .................. PCT/EP2017/058472

(51) Int. Cl.
*C04B 2/06* (2006.01)
*B01J 20/04* (2006.01)
(Continued)

(52) U.S. Cl.
CPC .......... *B01J 20/041* (2013.01); *B01D 53/508* (2013.01); *B01D 53/80* (2013.01); *B01D 53/83* (2013.01);
(Continued)

(58) Field of Classification Search
None
See application file for complete search history.

(56) References Cited

U.S. PATENT DOCUMENTS 5,502,021 A 3/1996 Schuster

FOREIGN PATENT DOCUMENTS

GB 2172277 A 9/1986
JP H05154335 A 6/1993
(Continued)

OTHER PUBLICATIONS

Wojciech Jozewicz et al., "Development and Pilot Plant Evaluation of Silica-Enhanced Lime Sorbents for Dry Flue Gas Desulfurization", JAPCA, Journal of the Air and Waste Management Association, 10 pages, vol. 37, No. 6, Jun. 1988.
(Continued)

*Primary Examiner* — Daniel Berns
(74) *Attorney, Agent, or Firm* — Whitaker Chalk Swindle & Schwartz PLLC; Charles Gunter

(57) ABSTRACT

The present invention is related to a process for manufacturing a sorbent suitable for a use in a circulating dry scrubber device comprising the steps of: providing quicklime and water in an hydrator; slaking said quicklime via a non-wet route in the hydrator; collecting a lime based sorbent at an exit of the hydrator. The process is character-
(Continued)

ized in that it comprises a further step of adding at least a first additive comprising: a compound comprising silicon, and/or, a compound comprising aluminum, and/or a compound comprising silicon and aluminum before or during said slaking step, at a molar ratio between silicon or aluminum or a combination thereof and the calcium provided to said hydrator equal to or below 0.2 and equal to or above 0.02. In some other aspects, the present invention is related to a sorbent, a premix, and a flue gas treatment process.

8 Claims, 10 Drawing Sheets

(51) Int. Cl.
*B01J 20/08* (2006.01)
*B01J 20/10* (2006.01)
*B01D 53/50* (2006.01)
*B01D 53/83* (2006.01)
*C04B 2/08* (2006.01)
*B01D 53/80* (2006.01)

(52) U.S. Cl.
CPC ............... *B01J 20/08* (2013.01); *B01J 20/10* (2013.01); *B01J 20/103* (2013.01); *C04B 2/06* (2013.01); *C04B 2/08* (2013.01); *B01D 2253/112* (2013.01)

(56) References Cited

FOREIGN PATENT DOCUMENTS

| | | |
|---|---|---|
| JP | 2001276566 A | 10/2001 |
| WO | 2015/073475 A1 | 5/2015 |

OTHER PUBLICATIONS

PCT/EP2018/058938, International Search Report and Written Opinion, dated May 28, 2018, 13 pages.

PROCESS FOR MANUFACTURING A SORBENT FOR A FLUE GAS TREATMENT PROCESS, SORBENT AND USE OF SAID SORBENT IN SUCH FLUE GAS TREATMENT PROCESS

TECHNICAL FIELD

In a first aspect, the present invention is related to a process for manufacturing a sorbent suitable for a use in a circulating dry scrubber device. In a second aspect, the present invention is related to a premix for use in said process for manufacturing a sorbent suitable for a use in a circulating dry scrubber device. In a third aspect, the present invention is related to a sorbent suitable for a use in a circulating dry scrubber device. In a fourth aspect, the present invention is related to the use of said sorbent in a circulating dry scrubber for a flue gas treatment process. In a fifth aspect, the present invention is related to a process for flue gas treatment using said sorbent. In a sixth aspect, the present invention is related to the use of a premix in a process of flue gas treatment wherein the premix is slaked in a hydrator upstream of a circulating dry scrubber device.

By the term "hydrator" in the meaning of the present invention, it is meant a conventional hydrator single or multi-stage or a mixer.

STATE OF THE ART

The combustion flue gases contain substances considered harmful to the environment and flue gases treatment is more and more often performed in order to remove or neutralize those harmful substances and pollutants. Various processes are used for flue gas treatment, including the scrubbing technology. A first type of such technology is the wet scrubber technology using wet scrubbers which work generally via the contact of target compounds or particulate matter with a scrubbing liquid which can be water for dust or solutions or suspensions of reagents for targeting specific compounds. A second type of scrubbing technology includes the dry scrubbing systems and the semi-dry scrubbing systems, also called semi-wet scrubbing systems. Those systems in comparison to the wet scrubbers do not saturate the treated flue gas with moisture. In some cases, no moisture is added, while in other cases only the amount of moisture that can be evaporated in the flue gas without condensing is added. The main use of dry or semi-dry scrubbing devices is related to the capture and removal of acid gases such as sulfur oxides and hydrochloric acid primarily from combustion sources. In the present disclosure, the terms "circulating dry scrubber device" or "circulating dry scrubber installation" or "circulating dry scrubber systems" refers to either circulating dry scrubber systems or circulating semi-dry scrubber systems.

Circulating dry scrubber (CDS) technology was first developed for $SO_2$ removal in coal-fired power plants. Today it is also used in flue gas treatment for industrial furnaces and boilers that use biomass, industrial or municipal waste as fuels. The CDS process is based on the recirculation of residues collected from particulate control device, comprising unreacted sorbent, reaction products and optionally fly ash.

A CDS unit generally comprises a reactor for receiving flue gases and sorbents which are generally calcium-based sorbents. The reactor is followed by a particulate control device which filters the solids (also called residues and comprising unreacted sorbent, reaction products and optionally fly ash) from the gas released. These solids are partially recycled into the reactor afterwards through a recycling loop. Some fresh sorbent can be periodically or continuously added to the reactor, before or after. In most cases water is injected into the reactor and/or onto the solids for temperature control, to improve the pollutants removal performances and to re-activate the residues. Some CDS facilities may comprise a hydrator (also called slaking unit) and use quicklime CaO that is hydrated prior to entering the CDS process. Some other CDS facilities do not comprise any hydrator and the fresh sorbent injected is hydrated lime.

In a first way to handle a CDS process, the residues are wetted before reinjection in the reactor. In a second way to handle a CDS process, water is directly injected in the reactor.

Unfortunately, even if the CDS technology is effective in terms of removal of pollutants, limitations exist regarding the amount of water which can be added, while water addition remains a key factor for removal of these pollutants. Indeed, it is known that higher capture levels of acid gases can be achieved by increasing the flue gases moisture, while keeping in mind that going below the dew point may cause corrosion issues especially in the reactor.

In the case wherein the residues are wetted before reinjection in the reactor, the maximum water content relative to the mass of dry recirculated residue observed at commercial scale is 10 weight %, more often between 2 and 7 weight %. Above 10% of water content, sticky behavior and dogging phenomena occur on duct walls both in the recycling loop and in the reactor, bringing operational instability up to a complete stop of the flue gas cleaning unit.

In the case wherein water is directly injected in the reactor, even though water is not carried by the recycled material, clogging phenomena appearing in the reactor are still observed, thereby impacting negatively the flue gases treatment process.

A reagent for removing hydrocarbons, halogenated hydrocarbons, dioxins, furans and heavy metals from exhaust gases is disclosed in document U.S. Pat. No. 5,505,021. Such reagent is based on mixtures of calcium hydroxide with additives characterized by a mixture of dry slaked lime with porous ground day as additive or dry foamed slaked lime with ground clay as additive, wherein the mixture contains about 60 to 99 wt. percent of slaked lime based on the dry weight. In the examples of reagents provided in this document, the clay utilized is bentonite. The reagents presented in this prior art document can be used as powder in fluidized bed reactors, and in granular or compacted form, for example, in traveling bed reactors, fixed bed reactors or granular bed reactors or again in fluidized bed reactors. However, the applicant has found that those reagents and compositions are not adapted for circulating in a circulating dry scrubber installation because some problems of clogging appears quickly with formation of big solid balls of residues and the conversion rate of calcium hydroxide into calcium sulfate is relatively low with respect to a lime-based sorbent without bentonite.

The document GB2172277 discloses a process for preparing a desulfurizing and denitrating agent which comprises providing as first raw material, one or more materials capable of yielding calcium oxide and calcium sulfate, providing as a second raw material one or more materials capable of yielding silicon dioxide and aluminum oxide, mixing the first raw material or a mixture of the first raw materials and either fractional or whole portion of the second raw material with water, and then subjecting the resultant aqueous mixture to wet-air aging at room temperature or to steam aging. In the case of wet-air aging, it is preferred to conduct it for about 1 week at a relative humidity of 50% to 100%. Steam aging is preferably carried out at a temperature of 60° C. to 100° C. and a relative humidity of 100% for 5 to 72 hours. The wet-air aging or steam aging provides a hardened material that has to be ground and classified. Such a process is time consuming and is not viable industrially. Any modification of a parameter of the process such as the concentration of calcium sulfate provides great variance of the specific surface area and some experiments show that drying the desulfurizing and denitrating agent provides better results in term of SO2 captation than wet samples.

There is also a need to provide a sorbent or a process allowing the operation of a CDS process wherein the water content can be increased without impacting negatively the circulating dry scrubbing process. It is particularly desirable to at least reduce the sticky behavior and the clogging phenomena of the recycled materials on duct walls, in the recycling loop and in the reactor.

SUMMARY OF THE INVENTION

According to a first aspect of the invention, a process for manufacturing a sorbent suitable for a use in a circulating dry scrubber device comprising the steps of:
  providing quicklime and water in an hydrator;
  slaking said quicklime in the hydrator via a non-wet route;
  collecting a lime based sorbent at an exit of the hydrator
characterized in that said process comprises a further step of adding at least a first additive comprising:
  a compound comprising silicon, preferably selected among the group comprising silicates, silicates of sodium, metasilicates, metasilicates of sodium, kieselguhr, diatomite, diatomaceous earth, precipitated silica, rice husk ash, silica fume, perlites, silicic acid, amorphous silica, calcium silicates or a combination thereof, and/or;
  a compound comprising aluminum preferably selected among the group comprising aluminates, aluminates of sodium, aluminum trihydroxide, boehmite, calcium aluminates or a combination thereof, and/or;
  a compound comprising silicon and aluminum preferably selected among the group comprising aluminosilicates, aluminosilicates of sodium, fly ash, blast furnace slag, vermiculite paper ash, or a combination thereof;
before or during said slaking step, at a molar ratio between silicon or aluminum or a combination thereof and the calcium provided to said hydrator equal to or below 0.2 and equal to or above 0.02.

According to the invention, the term "slaking via a non-wet route" refer to slaking quicklime with:
  an adapted amount of water corresponding to what is required for the slaking reaction of quicklime increased with the amount lost as steam because of the exothermic nature of the reaction, and such as to obtain calcium hydroxide with a targeted residual moisture inferior to 2 w % of the product or;
  an adapted amount of water enough to obtain calcium hydroxide with a targeted residual moisture of the order of 15 to 35% by mass or;
  an adapted amount of water enough to obtain calcium hydroxide with a targeted residual moisture inferior to 15 w % by mass.

By "adapted amount of water" is meant that for a predetermined amount of water and quicklime used in the step of slaking, the residual moisture of the lime based sorbent is measured at the exit of the hydrator and in the case wherein the measured residual moisture of the sorbent differs from the targeted residual moisture, the amount of water relative to the amount of quicklime is increased or decreased.

As it can be seen, the process according to the present invention, by slaking the quicklime in presence at least one compound comprising silicon or aluminum or a combination thereof added before or during said slaking step, allows the manufacturing of a sorbent able to provide a residue in a circulating dry scrubber device which is able to carry more water than prior art residues while keeping a good flowability of such residue in the CDS process, thereby preventing sticking in pipes, ducts or other parts of the circulating dry scrubber device. The sorbent according to the invention is able to release its carried water at low temperature, typically at the temperature of the circulating dry scrubber device between 50° C. and 350° C. The molar ratio between silicon or aluminum or a combination thereof and the calcium provided to said hydrator being equal to or below 0.2 and equal to or above 0.02 ensure a good compromise between having a benefit from the addition of the compound comprising silicon or aluminum or the combination thereof without increasing too much the material production costs.

The sorbent manufactured in the process according to the present invention provides a residue in a CDS process that presents good flowability properties. The presence of silicon or aluminum or a combination thereof in the sorbent therefore ensure a good flowability even with high moistures such as more than 10 weight % in the residue circulating in a circulating dry scrubber device.

With higher water content in the sorbent carrying water, the performance of the flue gas treatment device is thought to be improved significantly because:
  adding water is believed helping conditioning the gas reducing in particular the reaction temperature and increasing relative humidity;
  the added water is believed helping rejuvenating the residues bringing remaining $Ca(OH)_2$ available for reaction again;
  the added water is believed creating local favorable conditions around the solid in the reactor to boost the activity of the sorbent, the reaction products (the added water may help converting carbonated forms of Ca into reacted species with targeted acid gas removal ($SO_x$, HCl, HF . . . ) and even possibly the fly ash.

If the same quantity of water can be brought in the reactor on a lower quantity of recycled materials, downsizing the conditioning mixer and all related equipment in particular the conveying devices (screws, airslides . . . ) could be possible at the benefit of investment costs but also utilities and maintenances costs to run a CDS process, which will be reduced as less material would circulate.

By quicklime, it is meant within the meaning of the present invention a mineral solid material for which the chemical composition is mainly calcium oxide, CaO. Quicklime is usually obtained by calcination of limestone (mainly $CaCO_3$). The quicklime suitable according to the present invention comprises at least 70 weight %, preferably 80 weight %, preferably 90 weight % CaO, preferably at least 92 weight %, more preferably at least 94 weight % CaO with respect to the total weight of quicklime, as measured with the sugar method (available lime according to standard EN 459).

Quicklime may also contain impurities including for example, sulfur oxide, $SO_3$, silica, $SiO_2$ or even alumina, $Al_2O_3$. The impurities are expressed herein under their oxide form, but of course, they might appear under different phases. Within the meaning of the present invention, the impurities may be present at a level from 0.5 to 15 weight %, preferably at most 10 weight %, preferably at most 5 weight %, preferably at most 2 weight %, more preferably at most 1 weight % impurities with respect to the total weight of quicklime.

Quicklime contains generally also residual limestone $CaCO_3$, called unburned residues. The quicklime suitable according to the present invention may comprise $CaCO_3$ at an amount, comprised in the range of 0.5 to 20 weight %, preferably equal to or lower than 10 weight %, preferably lower or equal to 5 weight %, more preferably equal to or lower than 3 weight %, most preferably equal to or lower than 1 weight % with respect to the total weight of the quicklime.

The quicklime suitable according to the present invention may further comprise MgO at an amount, expressed under MgO form, comprised in the range of 0.5 to 10 weight %, preferably equal to or lower than 5 weight %, more preferably equal to or lower than 3 weight %, most preferably equal to or lower than 1 weight % with respect to the total weight of the quicklime.

In addition, the quicklime suitable according to the present invention may comprise $Ca(OH)_2$, resulting from the reaction of CaO with ambient moisture during handling and storage periods, at an amount comprised in the range of 0.5 to 10 weight %, preferably equal to or lower than 5 weight %, more preferably equal to or lower than 2 weight %, most preferably equal to or lower than 1 weight % with respect to the total weight of the quicklime as measured by the loss on ignition method at 550° C.

Typically, to form slaked lime, also sometimes called hydrate or hydrated lime, quicklime is provided in presence of water. Calcium oxide from the quicklime reacts quickly with water to form calcium di-hydroxide $Ca(OH)_2$, under the form of slaked lime or hydrated lime, in a reaction called hydration or slaking reaction which is very exothermic. In the following, calcium di-hydroxide will be simply called calcium hydroxide.

The slaked lime may therefore contain the same impurities than the quicklime from which it is produced.

The slaked lime may also comprise calcium oxide, which might not have been entirely hydrated during the slaking step, or calcium carbonate $CaCO_3$. The calcium carbonate can be originated from the original limestone (unburned) from which said slaked lime is obtained (via calcium oxide) or being the result of a partial carbonation reaction of slaked lime through the contact with an atmosphere containing $CO_2$. The amount of $CaCO_3$ in the slaked lime can be equal to or lower than 20 weight %, preferably equal or lower than 10 weight %, preferably equal to or lower than 5 weight %, more preferably equal to or lower than 3 weight %, and most preferably equal or lower than 1 weight %, with respect to the total weight of the slaked lime according to the present invention.

In the process of manufacturing according to the invention, the step of slaking is a slaking mode via a "non-wet route" which designates slaking modes via a dry route, via a quasi-dry route or via semi-dry route.

In a non-wet route, the amount of water relative to the amount of quicklime is optimized such as to obtain a hydrated lime product with a targeted moisture comprised between 0.5 and 35 weight %, as measured on the raw hydrate taken at the outlet of the hydrator. The expression "non-wet route" excludes the two slaking modes via a wet route and via a putty route. Each of these slaking routes is defined herein after.

In a dry hydration of quicklime, meaning a slaking mode "via a dry route", the amount of added water corresponds to what is required for the slaking reaction of quicklime, increased with the amount lost as steam because of the exothermic nature of the reaction, typically, the double of the stoichiometric quantity of water is added to the hydrator. Upon exiting the hydrator, the obtained product is powdery and generally comprises both at maximum 2% of residual non-hydrated CaO and at most 2% of moisture, with preferably a maximum of 1% of moisture. It may be packaged and sold directly, after optional steps for controlling grain size. Typically the mass ratio of water to quicklime used for slaking quicklime via a dry route is comprised between 0.6 and 0.7. However, this mass ratio may depend of the type of hydrator, the type of quicklime and the type of additive used. In some cases wherein additives such as for example water-glass or pentahydrated sodium metasilicate, are used, those additive already bring water molecules and therefore the amount of water for slaking quicklime in presence of additive has to be adapted in function of the targeted moisture of the sorbent and of the measured moisture of the sorbent.

When some installations have a hydrator connected to the CDS unit, those hydrators may produce a hydrated lime with a moisture inferior or equal to 4% but eventually with more remaining quicklime. This remaining quicklime is hydrated afterwards during its passage in the CDS unit. The percentage of moisture is measured under atmospheric pressure by measuring the weight loss during heating at 150° C. of 20 g of lime product until the weight of the lime product does not vary of more than 2 mg for at least 20 seconds.

In a quasi-dry hydration of quicklime, being another slaking mode, the hydration may be achieved with a larger excess of water according to WO 97/14650. In this case, the obtained hydrate contains moisture of the order of 15 to 35% by mass when exiting the hydrator. Because of this humidity, the hydrated lime requires a drying and de-agglomeration step before storage and transport. Typically the mass ratio of water to quicklime used for quasi-dry hydration of quicklime is comprised between 0.85 and 1.2. However, as described above, this mass ratio may depend of the type of hydrator, the type of quicklime and the type of additive used and therefore the amount of water has to be adapted in function of the targeted moisture of the sorbent and of the measured moisture of the sorbent.

In a semi-dry hydration of quicklime, one referred to any amount of water added for the slaking reaction between the dry hydration of quicklime and the quasi-dry hydration of quicklime. Typically the mass ratio of water to quicklime used for slaking quicklime is comprised between 0.7 and 0.85. However, as described above, this mass ratio may depend of the type of hydrator, the type of quicklime and the type of additive used and therefore the amount of water has to be adapted in function of the targeted moisture of the sorbent and of the measured moisture of the sorbent.

In a slaking mode «via by a wet route», the amount of added water is in very large excess as compared with the amount strictly required for the slaking reaction. A milk of lime is then obtained, i.e. an aqueous suspension of slaked lime particles.

In a slaking mode "via a putty route", the amount of water used for the slaking reaction is a little lower than the amount of water used for the slaking "by the wet route" and the obtained product is pasty (lime putty).

Advantageously, in the process of manufacturing according to the invention, said first additive is provided at least partially in a solution or in a suspension and added to said water and/or said first additive is provided at least partially under solid form and added to said quicklime.

In an embodiment of the process of manufacturing according to the invention said first additive comprises at least 4 weight % of silicon or aluminum or of a combination thereof, preferably at least 7 weight % of silicon or aluminum or of a combination thereof, preferably at least 10 weight % of silicon or aluminum or of a combination thereof, preferably at most 50 weight % of silicon or aluminum or of a combination thereof, preferably at most 40 weight %, preferably at most 30 weight % of silicon or aluminum or of a combination thereof with respect to the total weight of said additive.

In the context of the present invention, the amounts of silicon and aluminum in the first additive can be measured by the following procedure:
- a sample of additive is dried at 150° C. in a thermobalance until constant weight to determine the moisture of the additive;
- on the dried sample, a thermogravimetric analysis (TGA) is performed with a ramp of 5° C./min until 950° C. under flow of nitrogen, which allows to know the other compounds leaving under heating like crystallized water or CO2;
- still on the dried sample, the total elemental silicon, aluminum, calcium an other possible elements are measured by X ray fluorescence (XRF) and the results of the XRF analysis are corrected with the results of the TGA to take into account in the composition the crystallization water which is not seen in XRF, then the results are normalized to 100% to obtain the composition of the dry sample;
- then the composition is recalculated to take into account the moisture measured at 150° C. to know the elemental composition of additive.

In an embodiment of the process of manufacturing according to the invention said quicklime and said first additive are provided in a premix containing at least 50 weight % of quicklime, preferably at least 70 weight % of quicklime, preferably at least 80 weight % of quicklime, preferably at least 90 weight % of quicklime, preferably at least 98.5 weight % of quicklime and at least 0.7 weight % of silicon or aluminum or a combination thereof, preferably at least 0.8 weight % of silicon or aluminum or a combination thereof, preferably at least 0.9 weight % of silicon or aluminum or a combination thereof and at most 10 weight % of silicon or aluminum or a combination thereof preferably at most 7 weight % of silicon or aluminum or a combination thereof preferably at most 5 weight of silicon or aluminum or a combination thereof preferably at most 3 weight % of silicon or aluminum or a combination thereof with respect to the total weight of said premix under a dry form.

In an embodiment of the process of manufacturing according to the invention that said first additive further comprises sodium.

In an embodiment of the process of manufacturing according to the invention, a further step of adding a second additive comprising a compound comprising sodium is performed.

Preferably, the second additive comprising sodium is soluble in water, such as for example sodium hydroxide, sodium carbonate, sodium hydrogenocarbonate, sodium nitrate, sodium phosphate, sodium persulfate or sodium acetate. Preferably, the second compound has a solubility in water at 20° C. superior or equal to 50 g/dm$^3$, preferably superior or equal to 100 g/dm$^3$, preferably superior or equal to 200 g/dm$^3$, preferably superior or equal to 300 g/dm$^3$, preferably superior or equal to 500 g/dm$^3$.

Advantageously, in the process of manufacturing according to the invention, the said second additive is provided at least partially in a solution or in a suspension and added to the said water and/or the said second additive is provided at least partially under solid form and added to the said quicklime.

The said second additive may be added in the process before or during or after the step of slaking, whereas the said first additive must be added before or during said slaking step.

In an embodiment of the process of manufacturing according to the invention the molar ratio between silicon or aluminum or the combination thereof and sodium is equal to or above 0.4, preferably equal or above 0.5 and of maximum 20. Preferably, the molar ratio between silicon or aluminum or the combination thereof and sodium is of maximum 10, preferably of maximum 5, more preferably of maximum 2.

In an embodiment of the process of manufacturing according to the invention, a step of drying said lime based sorbent or classifying said lime based sorbent or grinding said or milling said sorbent or a combination of those steps is performed.

In an embodiment of the process of manufacturing according to the invention the said first additive is a pozzolan material.

Advantageously, in the process according to the present invention, the residence time of quicklime being slaked inside the hydrator is comprised between 5 and 45 minutes, preferably between 20 and 40 minutes and more preferably between 25 and 35 minutes.

Other embodiments of the process according to the first aspect of the present invention are mentioned in the appended claims According to a second aspect, the present invention is related to a premix for a process for manufacturing a sorbent suitable for use in a circulating dry scrubber device, said premix comprising quicklime and a first additive comprising:
- a compound comprising silicon, preferably selected among the group comprising silicates, silicates of sodium, metasilicates, metasilicates of sodium, kieselguhr, diatomite, diatomaceous earth, precipitated silica, silica fume, perlites, silicic acid, rice husk ash, amorphous silica, calcium silicates or a combination thereof, and/or;
- a compound comprising aluminum preferably selected among the group comprising aluminates, aluminates of sodium, aluminum trihydroxide, boehmite, calcium aluminates or a combination thereof, and/or;
- a compound comprising silicon and aluminum preferably selected among the group comprising aluminosilicates, aluminosilicates of sodium, fly ash, blast furnace slag, vermiculite paper ash, or a combination thereof;

with a molar ratio between the silicon or aluminum or the combination thereof and the calcium equal to or below 0.2 and equal to or above 0.02.

As it can be seen, the premix according to the present invention is providing quicklime and at least one additive comprising silicon or aluminum or a combination thereof to be slaked for example on site, just before using it for example in a CDS process. The premix according to the present invention ensures the presence of said at least one compound comprising silicon or aluminum or a combination thereof when slaking the quicklime and allows the manufacturing of a sorbent able to provide a residue which has a good flowability in a circulating dry scrubber (CDS) device in a CDS process, thereby preventing sticking in pipes, ducts or other parts of the circulating dry scrubber device.

The sorbent resulting from hydration of the premix according to the invention is able to release its carried water at low temperature, typically at the temperature of the circulating dry scrubber device between 50° C. and 350° C. The molar ratio between silicon or aluminum or a combination thereof and the calcium provided to said hydrator being equal to or below 0.2 and equal to or above 0.02 ensure a good compromise between having a benefit from the addition of the compound comprising silicon or aluminum or the combination thereof without increasing too much the material production costs.

Indeed, for installations comprising a circulating dry scrubber device and a hydrator on the same site, it can be advantageous to provide a premix comprising quicklime and at least said first additive. Such a premix can be provided to the hydrator for slaking in the process of manufacturing the sorbent according to the present invention. In this case, fresh sorbent according to the invention can be manufactured on site just before its use in the flue gas treatment process.

In an embodiment of the premix according to the invention, the said first additive further comprises sodium and/or the said premix further comprises a second additive comprising a compound comprising sodium.

In an embodiment, the premix according to the invention comprises at least 50 weight % of quicklime preferably at least 70 weight % of quicklime, preferably at least 80 weight % of quicklime, preferably at least 90 weight % of quicklime, preferably at least 98.5 weight % of quicklime and at least 0.7 weight % of silicon or aluminum or a combination thereof, preferably at least 0.8 weight % of silicon or aluminum or a combination thereof, preferably at least 0.9 weight % of silicon or aluminum or a combination thereof and at most 10 weight % of silicon or aluminum or a combination thereof preferably at most 7 weight % of silicon or aluminum or a combination thereof preferably at most 5 weight of silicon or aluminum or a combination thereof preferably at most 3 weight % of silicon or aluminum or a combination thereof with respect to the total weight of said premix under a dry form. The amounts of calcium, silicon and aluminum in the premix can be measured by the following procedure:
- a sample of premix is dried at 150° C. in a thermobalance until constant weight to determine the moisture of the premix;
- on the dried sample of premix, a thermogravimetric analysis (TGA) is performed with a ramp of 5° C./min until 950° C. under flow of nitrogen, which allows to measure the bound water leaving before 350° C., the water leaving from Ca(OH)2 corresponding to the loss of weight between 350° C. and 600° C. and the CO2 leaving from CaCO3 corresponding to the loss of weight between 600° C. and 900° C., the loss of weight between 350-600° C. and between 600-900° C. allow to determine the percentages of Ca(OH)2 and CaCO3 respectively;
- still on the dried sample, the elemental total calcium (i.e. the calcium under the form CaO, Ca(OH)2, CacO3 or any other form) the silicon, aluminum and any other element are measured by XRF and the results of the XRF analysis are corrected by the results of the TGA to take into account in the composition the total water and the results are normalized to 100% to obtain the composition of the dry premix.

In an embodiment of the premix according to the present invention, the molar ratio between the silicon or aluminum or the combination thereof and the sodium is of at least 0.4, preferably at least 0.5 and of maximum 20.

Preferably, the molar ratio between silicon or aluminum or the combination thereof and sodium is of maximum 10, preferably of maximum 5, more preferably of maximum 2.

Other embodiments of the premix according to the second aspect of the present invention are mentioned in the appended claims.

According to a third aspect of the present invention, a sorbent suitable for use in a circulating dry scrubber device comprises at least 50 weight % of $Ca(OH)_2$, preferably at least 70 weight % of $Ca(OH)_2$, at least 80 weight % of $Ca(OH)_2$, at least 90 weight % of $Ca(OH)_2$, at least 95 weight % of $Ca(OH)_2$, and at least 0.5 weight % of silicon or aluminum or a combination thereof, preferably at least 0.6 weight % of silicon or aluminum or a combination thereof, preferably at least 0.7 weight % of silicon or aluminum or a combination thereof, preferably at least 0.8 weight % of silicon or aluminum or a combination thereof, and at most 8 weight % of silicon or aluminum or a combination thereof, preferably at most 5 weight % of silicon or aluminum or a combination thereof, preferably at most 3 weight % of silicon or aluminum or a combination thereof, preferably at most 2 weight % of silicon or aluminum or a combination thereof expressed under its elemental form with respect to the total weight of said sorbent under a dry form. Said sorbent according to the present invention is further characterized in that it comprises 1 to 12 weight % of bound water, preferably at least 1.2 weight %, more preferably at least 1.5 weight % more preferably at least 2 weight %, preferably 10 weight % or less, with respect to the total weight of said sorbent under a dry form and the sorbent according to the invention, at least 1 mol % of calcium is neither under the form of $Ca(OH)_2$ nor $CaCO_3$ nor CaO, preferably at least 2 mol % of calcium is neither under the form of $Ca(OH)_2$ nor $CaCO_3$ nor CaO, preferably at least 2.5 mol % of calcium is neither under the form of $Ca(OH)_2$ nor $CaCO_3$ nor CaO, preferably at least 3 mol % of calcium is neither under the form of $Ca(OH)_2$ nor $CaCO_3$ nor CaO and at most 40 mol % of calcium is neither under the form of $Ca(OH)_2$ nor $CaCO_3$ nor CaO, preferably at most 25 mol % of calcium is neither under the form of $Ca(OH)_2$ nor $CaCO_3$ nor CaO, preferably at most 15 mol % of calcium is neither under the form of $Ca(OH)_2$ nor $CaCO_3$ nor CaO, preferably at most 6 mol % of calcium is neither under the form of $Ca(OH)_2$ nor $CaCO_3$ nor CaO.

Preferably, the molar ratio between silicon or aluminum or the combination thereof and calcium is of at least 0.02 and of maximum 0.2.

The amounts of calcium, silicon and aluminum in the sorbent can be measured by on a sample with the same procedure as described earlier for the measurement of the composition of the premix.

The bound water can be measured by thermogravimetric analysis, by introducing in an oven or a furnace a sample of sorbent according to the present invention, the sample being first dried until constant weight at 150° C. to remove the moisture and then heated until 350° C. until constant weight to remove the bound water, typically with a temperature ramp of 5° C./min under a flow of nitrogen. The loss of weight of the dried sample (i.e. between 150 and 350° C.) is related to the percentage of bound water in the sample.

The amount of calcium which is not under the form of Ca(OH)2 nor CaCO3 nor CaO is calculated by measuring the total amount of calcium by XRF analysis of the elemental calcium on a sample of sorbent as described above and by subtracting from the total amount of calcium the amount of Ca(OH)2 and the amount of CaCO3 measured by thermogravimetric analysis (TGA) of the sample to obtain the amount of Ca(OH)2 by measuring the loss of weight during gradual heating between 350° C. and 600° C. and the amount of CaCO3 by measuring the loss of weight during gradual heating between 600° C. and 900° C. It is assumed that the amount of CaO is negligible.

In an embodiment, the sorbent according to the present invention further comprises at least 0.1 weight % of sodium expressed under its equivalent $Na_2O$ oxide form, preferably at least 0.3 weight % of sodium expressed under its equivalent $Na_2O$ oxide form, preferably at least 0.5 weight % of sodium expressed under its equivalent $Na_2O$ oxide form, preferably at least 0.7 weight % of sodium expressed under its equivalent $Na_2O$ oxide form, preferably at most 15 weight % of sodium expressed under its equivalent $Na_2O$ oxide form, preferably at most 7 weight % of sodium expressed under its equivalent $Na_2O$ oxide form, preferably at most 5 weight % of sodium expressed under its equivalent $Na_2O$ oxide form, preferably at most 2 weight % of sodium expressed under its equivalent $Na_2O$ oxide form with respect to the total weight of said sorbent under a dry form.

In an embodiment of the sorbent according to the invention, the molar ratio between silicon or aluminum or a combination thereof and sodium is of at least 0.4, preferably at least 0.5 and of maximum 20. Preferably, the molar ratio between silicon or aluminum or the combination thereof and sodium is of maximum 10, preferably of maximum 5, more preferably of maximum 2.

Preferably, the sorbent according to the present invention when comprising sodium, has a BET specific surface area comprised of at least 3 $m^2/g$ and of maximum 25 $m^2/g$ measured by manometry with adsorption of nitrogen after degassing in vacuum at 190° C. for at least 2 hours and calculated according the multipoint BET method as described in the ISO 9277/2010E standard.

Advantageously, the sorbent according to the present invention, when comprising sodium has a total BJH pore volume of at least 0.01 $cm^3/g$ and of maximum 0.15 $cm^3/g$ determined manometry with adsorption of nitrogen after degassing in vacuum at 190° C. for at least 2 hours and calculated according the multipoint BJH method as described in the ISO 9277/2010E standard.

In another embodiment of the sorbent according to the present invention, the mean particle size $d_{50}$ ranges between 3 and 20 µm, in another embodiment, between 5 and 20 µm. The notation dx means a particle size distribution of a sample of particles wherein x % of the particles have a size under a certain value expressed in µm. The particle size distribution can be measured by laser granulometry of a sample in methanol after sonication.

In another embodiment of the sorbent according to the present invention, the particle size $d_{90}$ ranges from 12 µm and 1 mm, preferably from 12 µm to 100 µm, in another embodiment from 15 µm to 100 µm when measured after sonication.

Other embodiments of the sorbent according to the third aspect of the present invention are mentioned in the appended claims.

According to a fourth aspect, the present invention is related to the use of a sorbent such as disclosed herein or obtained from a process for manufacturing a sorbent according to the present invention in a circulating dry scrubber for a flue gas treatment process.

Other uses according to the fourth aspect of the present invention are mentioned in the description and in the appended claims.

According to a fifth aspect, the present invention is related to a process of flue gas treatment using a circulating dry scrubber device characterized in that it comprises a step of recirculating a sorbent such as disclosed herein or obtained from a process for manufacturing a sorbent according to the present invention into the said circulating dry scrubber.

In the process of flue gas treatment using a circulating dry scrubber device, the sorbent particles will enter in contact with flue gas and form a suspension of reacted sorbent particles, unreacted sorbent particles and eventually other by-products. The suspension is filtered by a particulate control device. The flue gas depleted in pollutants is directed to the chimney whereas residues R formed by reacted sorbent particles, unreacted sorbent particles and eventually other by-products are redirected and recycled in the CDS device for another cycle. The said residues can be recirculated and recycled several times. Some fresh sorbent can also be introduced at any time in the CDS installation. Water is added to reactivate the reacted sorbent.

With the sorbent according to the present invention, it is foreseen to add water on said residues circulating in the circulating dry scrubber (CDS) device such as to have a water content relative to the dry mass of residues of at least 5 weight %, preferably at least 7 weight %, preferably at least 10 weight %, preferably at least 12 weight %, preferably at least 15 weight %.

In function of the ratio of sulfur oxide to HCl in the flue gas treated in a circulating dry scrubber device, the amount of water added on the residues circulating in the circulating dry scrubber device can be adapted.

For ratios of sulfur oxide relative to HCl superior to 20, the amount of HCl is generally low and it is possible to add water on the residues circulating in the circulating dry scrubber device such as to have a water content relative to the dry mass which can go up to maximum 20 weight % without risk of clogging of residues in the circulating dry scrubber device.

For ratios of sulfur dioxide relative to HCl inferior to 20, the amount of HCl is generally considered as high and may cause more problem of clogging of the residues in the circulating dry scrubber device. Therefore for such ratios of sulfur oxide to HCl inferior to 20, the water on the residues circulating in the circulating dry scrubber device can be such as the water content relative to the dry mass of residues is only of at least 2 weight %.

In an embodiment, the process of flue gas treatment according to the invention comprises a step of introduction in the said circulating dry scrubber device of a sorbent according to the present invention or obtained from a process of manufacturing such as disclosed herein.

Other embodiments of the process according to the fifth aspect of the present invention are mentioned in the appended claims In a sixth aspect, the present invention is related to the use of a premix such as disclosed herein in a flue gas treatment process wherein the premix is slaked in a hydrator upstream of a circulating dry scrubber device.

Other uses according to the sixth aspect of the present invention are mentioned in the appended claims.

Other characteristics and advantages of the present invention will be derived from the non-limitative following description, and by making reference to the drawings and the examples.

BRIEF DESCRIPTION OF THE DRAWINGS

In the drawings, the same reference numbers have been allocated to the same or analog element.

DESCRIPTION OF THE INVENTION

Figure 1:
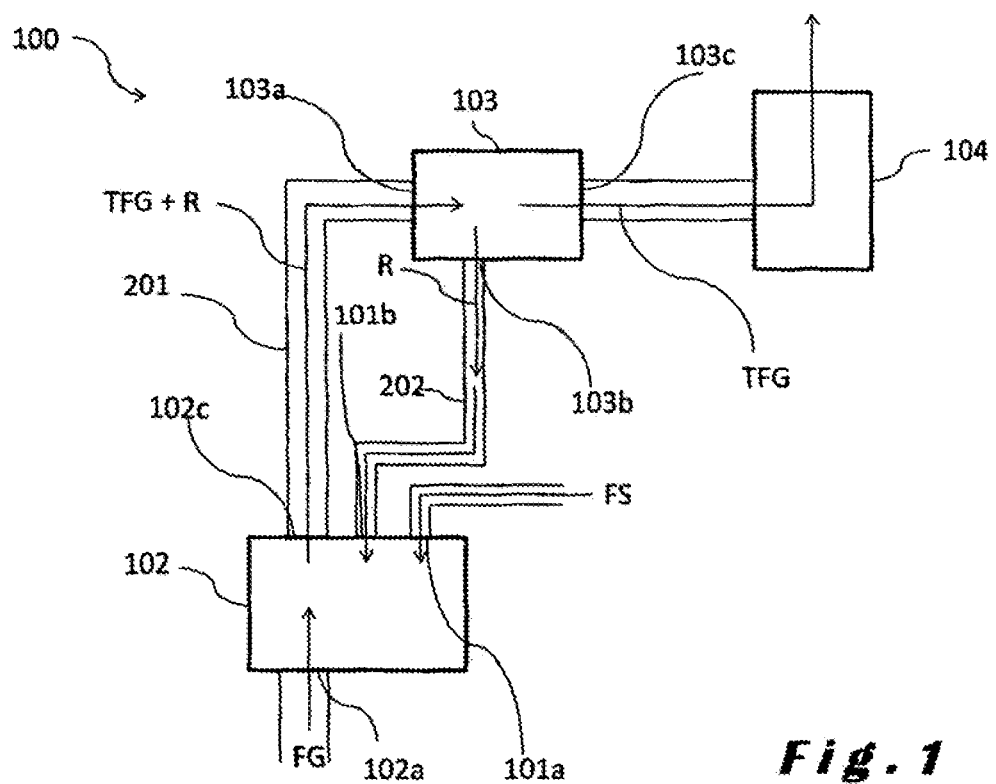
FIG. 1 shows a schematic embodiment of a circulating dry scrubber installation used in a process of flue gas treatment according to the present invention.

The FIG. 1 shows a schematic embodiment of a circulating dry scrubber for flue gas treatment. The circulating dry scrubber installation 100 (also referred as circulating dry scrubber device or CDS installation) comprises a loop through which residues and flue gas are circulated, said loop comprising:
- a reactor 102 comprising:
  - a flue gas inlet 102a;
  - a treated flue gas and residues outlet 102c; and
  - a residues inlet 102b;
- a particulate control device 103 comprising
  - a treated flue gas and residues inlet 103a connected by a first duct 201 to the said treated flue gas and residue outlet 102c of said reactor 102;
  - a residues outlet 103b connected by a second duct 202 to the said residues inlet 101b of the said reactor 102
  - a treated flue gas outlet 103c connected to a chimney 104;
  - a separation means (not illustrated) between a zone for accommodating the suspension of treated flue gas and residues and the treated flue gas outlet 103c, said zone communicating with said treated flue gas and residues inlet 103 and the second residues outlet 103b. The separation means separating the suspension of treated gas and residues in a treated gas depleted of residues and the residues for allowing the particulate control device to filter the treated gas from residues and
  - a fresh sorbent inlet 101a which can be arranged at any location on the loop formed by the reactor 102, the first duct 201, the zone of the particulate control device 103 and the second duct 202.

In the non-limitative embodiment of FIG. 1, the fresh sorbent inlet 101a is arranged on the reactor 102.

In a process for flue gas treatment using such a circulating dry scrubber device, a fresh sorbent FS is injected in the said loop, a flue gas FG containing pollutants flows through the reactor 102 entering by the said flue gas inlet 102a such as to form a suspension of residues in the said flue gas. The residues R comprises reacted sorbent particles, unreacted sorbent particles and eventually other by-products. The said suspension TFG+R is filtered by separation means of the said particulate control device 103 from which the said flue gases depleted in pollutants TFG are directed to the said chimney 104 whereas residues R are redirected and recycled to the said reactor 102 for another cycle. The said residues can be recirculated and recycled several times. Some fresh sorbent can also be introduced at any time in the CDS installation through the fresh sorbent inlet 101a.

Figure 2:
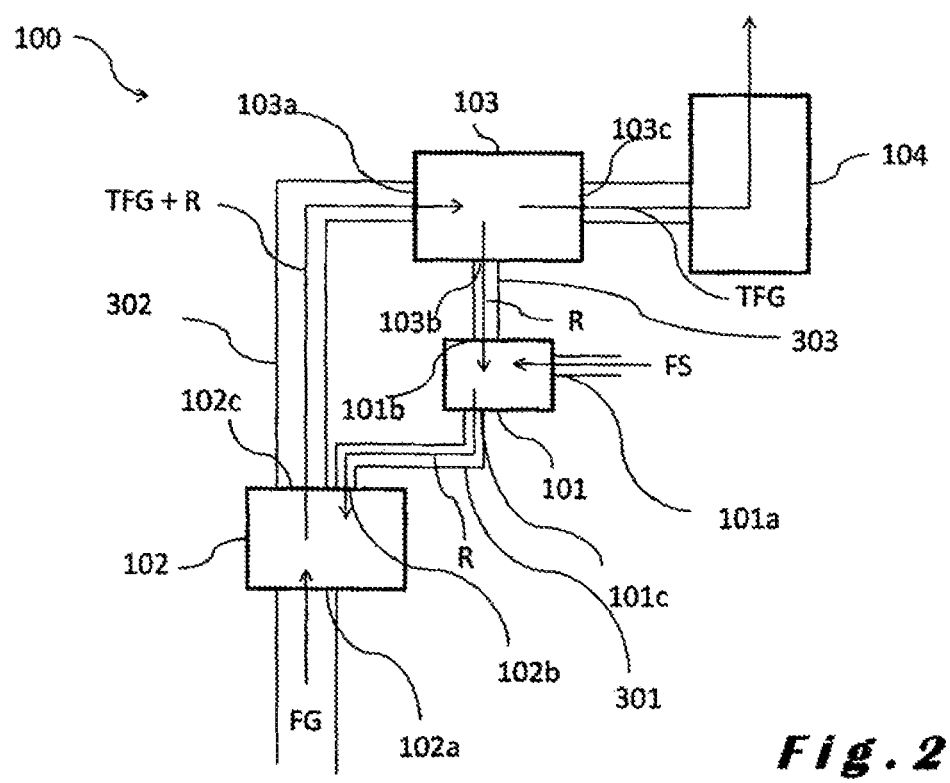
FIG. 2 shows an alternative schematic embodiment of a circulating dry scrubber installation used in a process of flue gas treatment according to the present invention.

The FIG. 2 shows a schematic embodiment of another embodiment of a circulating dry scrubber for flue gas treatment which further comprises a mixing zone 101. For example, a circulating dry scrubber installation 100 (also referred as circulating dry scrubber device) can comprise:
- a mixing zone 101 comprising:
  - a fresh sorbent inlet 101a;
  - a first residues inlet 101b; and
  - a first residues outlet 101c;
- a reactor 102 comprising:
  - a flue gas inlet 102a;
  - a second residues inlet 102b connected by a first duct 301 with the said first residues outlet 101c of the mixing zone; and
  - a treated flue gas and residues outlet 102c; and
- a particulate control device 103 comprising:
  - a treated flue gas and residues inlet 103a connected by a second duct 302 to the said treated flue gas and residues outlet 102c of said reactor 102,
  - a second residues outlet 103b connected by a third duct 303 to the said first residues inlet 101b of the mixing zone; and
  - a treated flue gas outlet 103c connected to a chimney 104
  - a separation means (not illustrated) between a zone for accommodating the suspension of treated flue gas and residues and the treated flue gas outlet 103c, said zone communicating with said treated flue gas and residues inlet 103a and the second residues outlet 103b. The separation means separating the suspension of treated gas and residues in a treated gas depleted of residues and the residues for allowing the particulate control device to filter the treated gas from residues.

In this embodiment of the CDS installation, the mixing zone 101, the first duct 301, the reactor 102, the second duct 302, the zone for accommodating the suspension of treated flue gas and residues of the particulate control device 103 and the third duct 303 form a loop through which residues can be recirculated and recycled several times. Some fresh sorbent can be introduced at any time in the CDS installation through the fresh sorbent inlet 101a.

In a process for flue gas treatment using such a circulating dry scrubber device, a fresh sorbent FS is injected to the said sorbent mixing zone 101. The fresh sorbent FS can be mixed with residues already present in the loop and then sent to the said reactor 102. A flue gas FG containing pollutants flows through the reactor 102 entering by the said flue gas inlet 102a such as to form a suspension of residues in the said flue gas. The residues R comprises reacted sorbent particles, unreacted sorbent particles and eventually other by-products. The said suspension TFG+R is filtered by the separation means of the said particulate control device 103 from which the said flue gases depleted in pollutants TFG are directed to the said chimney 104 whereas the said residues R are redirected to the said mixing zone 101 to be recycled and to be injected again in the reactor for another cycle. The rate of injection of sorbent and of residues is generally adapted in function of the size of the CDS device and of the flow of flue gas to be treated and the amount of pollutants to remove from the flue gas. Two important factors for the definition of the operation of a CDS process are:

the normalized stoichiometric ratio (NSR) between the fresh sorbent injected and the $SO_2$ and HCl contained in flue gas, and defined by the equation NSR=(Ca/N*P) wherein Ca is the number of moles of Ca(OH)2 of the said fresh sorbent injected in the reactor, P is the number of moles of pollutant from the said flue gas and;

N is the stoichiometric number of moles of pollutants that can react with Ca(OH)2 according to the theoretical chemical reaction to completely convert one mole of a Ca(OH)2;

a predetermined recycling ratio defined by the ratio of the injection rate of residues versus the injection rate of fresh sorbent.

In a process of flue gas treatment using a circulating dry scrubber device according to the present invention, the fresh sorbent introduced in the CDS installation is a lime based sorbent characterized in that it comprises at least 50 weight % of $Ca(OH)_2$, preferably at least 70 weight % of $Ca(OH)_2$, at least 80 weight % of $Ca(OH)_2$, at least 90 weight % of $Ca(OH)_2$, at least 95 weight % of $Ca(OH)_2$, and at least 0.5 weight % of silicon or aluminum or a combination thereof, preferably at least 0.6 weight % of silicon or aluminum or a combination thereof, preferably at least 0.7 weight % of silicon or aluminum or a combination thereof, preferably at least 0.8 weight % of silicon or aluminum or a combination thereof, and at most 8 weight % of silicon or aluminum or a combination thereof, preferably at most 5 weight % of silicon or aluminum or a combination thereof, preferably at most 3 weight % of silicon or aluminum or a combination thereof, preferably at most 2 weight % of silicon or aluminum or a combination thereof as well as from 1 to 12 weight % of bound water, preferably at least 1.2 weight %, more preferably at least 1.5 weight % more preferably at least 2 weight %, preferably 10 weight % or less with respect to the total weight of said sorbent under a dry form. The said sorbent comprises from 1 to 40 mol % of calcium which is neither under the form of $Ca(OH)_2$ nor $CaCO_3$ nor CaO.

The amounts of silicon and aluminum in the sorbent can be measured by XRF such as described herein above.

The methods for measuring the total calcium content in the sorbent, the amount of Ca(OH)2 in the sorbent and for determining in the sorbent the mol % of calcium which is neither under the form of Ca(OH)2 nor CaCO3 nor CaO have been presented herein above.

In the said sorbent, the molar ratio between silicon or aluminum or the combination thereof and calcium is of at least 0.02 and of maximum 0.2.

The sorbent according to the present invention is able to provide a residue which has a good flowability in the CDS process, thereby preventing sticking in pipes, ducts or other parts of the circulating dry scrubber device. The sorbent according to the invention is able to release its water at low temperature, typically at the temperature of the circulating dry scrubber device between 50° C. and 350° C.

The said sorbent is obtained by a process of manufacturing according to the invention comprising the steps of:
providing quicklime and water in a hydrator;
slaking said quicklime via a "non-wet route" in the hydrator:
collecting a lime based sorbent at an exit of the hydrator.

The said process of manufacturing is characterized in that it further comprises a step of adding at least a first additive comprising:

a compound comprising silicon, selected among the group comprising silicates, silicates of sodium, metasilicates, metasilicates of sodium, waterglass, kieseiguhr, diatomite, diatomaceous earth, precipitated silica, silica fume, perlites, silicic acid, amorphous silica, calcium silicates or a combination thereof and/or;

a compound comprising aluminum selected among the group comprising aluminates, rice husk ash, aluminates of sodium, aluminum trihydroxide, boehmite, calcium aluminates or a combination thereof and/or;

a compound comprising silicon and aluminum, selected among the group comprising aluminosilicates, aluminosilicates of sodium, fly ash, blast furnace slag, vermiculite, paper ash, or a combination thereof;

before or during said slaking step with a molar ratio between silicon or aluminum or the combination thereof and calcium of at least 0.02 and of maximum 0.2.

The said first additive can be a pozzolan material.

It is essential that the said step of slaking is performed "via a non-wet route" such as disclosed herein above.

Preferably, in the process of manufacturing of the sorbent of the invention, the said first additive can be provided at least partially in a solution or in a suspension in said water which is used for the step of slaking and/or the said first additive can be provided at least partially under solid form and added to said quicklime.

Preferably, in the process of manufacturing of the sorbent according to the invention, said first additive comprises at least 4 weight % of silicon or aluminum or of a combination thereof with respect to the total weight of said first additive. The amounts of silicon and aluminum in the said first additive can be measured by XRF as described herein above.

For installations comprising a circulating dry scrubber device and a hydrator on the same site, it can be advantageous to provide a premix comprising quicklime and at least said first additive with a molar ratio between silicon or aluminum or the combination thereof and calcium is of at least 0.02 and of maximum 0.2.

Such a premix can be provided to the hydrator for slaking in the process of manufacturing the sorbent according to the present invention. In this case, fresh sorbent according to the invention can be manufactured on site just before its use in the flue gas treatment process.

The premix can be introduced into a hydrator, for example in a single stage hydrator and hydrated with water with an amount of water leading to moisture of the raw hydrate ranging between 0.5 and 35 weight %, preferably at least 5 weight % and most preferably at least 10 weight %, particularly at most 25 weight % and most particularly at most 15 weight % with respect to the total weight of said raw hydrate. The water/solid ratio can be varied depending on the targeted moisture of the sorbent at the outlet of the hydrator.

Preferably, the said premix comprises at least 50 weight % of quicklime, preferably at least 70 weight % of quicklime, more preferably at least 80 weight % of quicklime, preferably more than 85%, preferably more than 90% of quicklime and at least 0.7 weight % and at most 10 weight % of silicon, aluminum, or a combination thereof with respect to the total weight of said premix under a dry form.

The amounts of silicon and aluminum in the premix can be measured by XRF as described herein above.

For installations comprising a circulating dry scrubber device without any hydrator on the same site, the sorbent according to the present invention is manufactured at another site according to the process of manufacturing of the present invention and is provided for example as a ready-to-use sorbent for use in the flue gases treatment process according to the invention.

The raw lime based sorbent coming out of the hydrator can be optionally deagglomerated and/or milled and/or dried before being used in a circulating dry scrubber device (also called CDS unit). Deagglomeration can be performed using a soft mill, typically a cage mill used only as a mill in this case and not for the drying of the sorbent. The sorbent according to the present invention can also be optionally classified with an air classifier.

The coarse fraction from the air classifier can be either separated and valorized independently from the fine fraction, or milled and blended with the fine fraction.

There can be some drying during the deagglomeration and classification steps whereas some percentages of moisture can be lost.

Therefore, the final product (the sorbent) has a moisture content between 0.5 and 25 weight %, preferably at least 5 weight % and most preferably at least 10 weight %, particularly at most 20 weight % and most particularly at most 15 weight % with respect to the total weight of said sorbent. The moisture content is determined by measuring the sample of final product at 150° C. in a thermobalance until constant weight.

In the process of manufacturing of the sorbent, the molar ratio between the silicon or aluminum or the combination thereof relative to the calcium is ranging from 0.02 to 0.2, preferably between 0.02 and 0.10, and most preferably between 0.02 and 0.05. Such ratios ensure a good compromise between having a benefit from the addition of the said first additive without increasing too much the material production costs. From the targeted molar ratio of silicon, aluminum or the combination thereof relative to the calcium in the sorbent, the amount of first additive to be blended with the quicklime can be calculated.

Depending on the molar ratio between the silicon or aluminum or the combination thereof relative to the calcium used in the process of manufacturing of the sorbent, and depending on the first additive, the sorbent may contain:

at least 50 weight % of $Ca(OH)_2$, preferably at least 55 weight % and preferably 92 weight % or less, more preferably 90 weight % or less of $Ca(OH)_2$ determined by TGA between 350° C. and 600° C. with a temperature ramp of 5° C./min under a flow of nitrogen as described herein above;

at least 1 weight % but maximum 10 weight %, preferably 8% or less, more preferably 5% or less of silicon, aluminum or a of combination thereof, respect to the total weight of said sorbent determined by XRF as described herein above;

some calcium which is neither under the form of $Ca(OH)_2$ nor $CaCO_3$, the amount of which, expressed by default in its oxide equivalent form CaO, ranging between 1 to 40 mol % and calculated by the formula: (mol total Ca-mol $Ca(OH)_2$- mol $CaCO_3$)×100/mol total Ca, wherein the mol total Ca is measured by XRF on a dried sample at 150° C. until constant weight, the mol $Ca(OH)_2$ is measured by TGA between 350° C. and 600° C. with a temperature ramp of 5° C./min under a flow of nitrogen, and the mol $CaCO_3$ is measured by TGA between 600° C. and 900° C. with a temperature ramp of 5° C./min under a flow of nitrogen;

at least 1 weight % of bound water, preferably at least 1.2 weight %, more preferably at least 1.5 weight % more preferably at least 2 weight %, preferably 10 weight % or less, such bound water being released between 150° C. and 350° C. typically with respect to the total weight of said sorbent under a dry form.

The rest being $CaCO_3$ or other impurities.

The percentage of Ca which is neither in the form of $Ca(OH)_2$, nor $CaCO_3$ increases with the initial molar ratio between the silicon or aluminum or the combination thereof relative to the calcium used in the process of manufacturing, for example in presence of silicate or metasilicate or aluminate or a combination thereof.

Depending on the conditions used such as the time of hydration, the amount of water provided in the step of slaking, the origin of quicklime, the nature of the first additive, some unreacted compound comprising silicon or aluminum or a combination thereof and some intermediate reaction products may remain in the final sorbent product.

The sorbent has preferably a $d_{50}$ between 3 and 20 μm, in another embodiment between 5 and 20 μm and a $d_{90}$ between 12 and 100 μm, in another embodiment between 15 and 100 μm (when measured with sonication).

The sorbent obtained by the process of manufacturing according to the invention may contain large soft agglomerates that can be broken by sonication.

The sorbent according to the present invention provides a residue in a CDS process that presents good flowability properties.

The presence of Si or Al or a combination thereof in the sorbent could therefore ensure a good flowability even with high moistures also called carried water such as more than 10 weight % in the residue circulating in a circulating dry scrubber device with respect to the total weight of said sorbent under a dry form.

In an embodiment, the sorbent further comprises at least 0.1, preferably at least 0.3 to 15 weight % of sodium expressed under its equivalent $Na_2O$ oxide form with respect to the total weight of said sorbent under a dry form.

Preferably, in the sorbent, the molar ratio between silicon or aluminum or a combination thereof and sodium is of at least 0.4, preferably at least 0.5 and of maximum 20.

Such a sorbent may be produced from a process of manufacturing as presented above and wherein the process further comprises a step of adding at least the said first additive before or during said slaking step with a molar ratio between silicon or aluminum or the combination thereof and calcium is of at least 0.02 and of maximum 0.2, and wherein the said first additive further comprises sodium.

Alternatively, such a sorbent may be produced from a process of manufacturing as presented above and wherein the process further comprises a step of adding at least said first additive before or during said slaking step with a molar ratio between silicon or aluminum or the combination thereof and calcium is of at least 0.02 and of maximum 0.2, and a second additive comprising sodium. When a second additive comprising compound comprising sodium is added in the process, such second compound comprising sodium can be added before or during the step of slaking but also after the step of slaking in a further step of mixing.

Preferably, the said second additive comprising sodium is hydrosoluble and can be selected amongst sodium hydroxide, sodium carbonate, sodium hydrogenocarbonate, sodium nitrate, sodium phosphate, sodium persulfate or sodium acetate. Preferably, the second additive has a solubility at 20° C. in water superior or equal to 50 g/dm$^3$, preferably superior or equal to 100 g/dm$^3$, preferably superior or equal to 200 g/dm$^3$, preferably superior or equal to 300 g/dm$^3$, preferably superior or equal to 500 g/dm$^3$.

Preferably, said second additive comprising sodium may be provided at least partially in a solution or in a suspension and added to the said water and/or said second compound comprising sodium may be provided at least under solid form and added to the said quicklime.

Preferably, the molar ratio between silicon or aluminum or the combination thereof relative to sodium is above 0.5 and of maximum 20.

In function of the molar ratio between the silicon or aluminum or the combination thereof relative to the calcium used in the process of manufacturing, and in function of the molar ratio between silicon or aluminum or the combination thereof relative to sodium used in the process, the sorbent may contain:
- at least 50 weight % of Ca(OH)$_2$, preferably at least 55 weight % and preferably 92 weight % or less, more preferably 90 weight % or less of Ca(OH)$_2$ determined by thermogravimetric analysis between 350° C. and 600° C. with a temperature ramp of 5° C./min under a flow of nitrogen;
- at least 1 weight % but maximum 10 weight %, preferably 8% or less, more preferably 5% or less of silicon, aluminum or a of combination thereof, with respect to the total weight of said sorbent under a dry form determined by XRF as described herein above;
- at least 0.3 weight % and 15 weight % or less of sodium expressed in Na$_2$O with respect to the total weight of said sorbent under a dry form, and determined by XRF as described herein above;
- some calcium which is neither under the form of Ca(OH)2 nor CaCO3, the amount of which, expressed by default in its oxide equivalent form CaO, ranging between 1 to 40 mol % and determined as disclosed herein above;
- 1 weight % of bound water, preferably at least 1.2 weight %, more preferably at least 1.5 weight %, preferably 10% or less, such bound water being released between 150° C. and 350° C. typically with respect to the total weight of said sorbent under a dry form.

The rest being CaCO3 and/or other impurities.

The sorbent comprising said first additive and sodium in the said first additive or in a second additive according to an embodiment of the invention has a specific surface area calculated according to the BET method as mentioned before comprised between 3 and 25 m$^2$/g and a total pore volume calculated according to the BJH method ranging between 0.01 and 0.15 cm$^3$/g.

The sorbent has preferably a d$_{50}$ between 3 and 20 μm, in an embodiment between 5 and 20 μm and a do between 12 and 100 μm, in another embodiment between 15 and 100 μm (when measured after sonication).

The sorbent obtained by the process of manufacturing according to the invention may contain large soft agglomerates that can be broken by sonication.

In a non-limitative example of the process of manufacturing of a sorbent according to the present invention, a first additive comprising silicon and sodium is used, namely sodium metasilicate pentahydrated Na$_2$SiO$_3$.5H2O corresponding to 28 weight % SiO$_2$, 29 weight % Na$_2$O and 43% of water. O the sodium metasilicate of formula Na2SiOO3.nH2O can be utilised wherein n=0, 5 or 9.

In another non-limitative example of the process of manufacturing of a sorbent according to the invention, a first additive comprising silicon and sodium is used, namely waterglass. Two compositions of waterglass are preferred and comprise sodium and silicon expressed in equivalent Na2O and SiO2 respectively. A first preferred composition of waterglass comprises 29.7 w % of SiO2, 15.3 w % of Na2O and 55 w % of H2O. A second preferred composition of waterglass comprises 27.6 w % of SiO2, 8.4 w % of Na2O and 64 w % of H2O. Waterglass has a general formulae Na2O.xSiO2+H2O with x=1.6 to 3.5 and a water content typically comprised between 50 to 70 w %, more particularly between 53 to 66 w %.

Solid sodium silicates are preferably provided in the premix and have the general formulae Na2O.xSiO2.nH2O with x=2 à 3.5 and a crystallization water content comprised between 0 and 20%.

For installations comprising a circulating dry scrubber device and a hydrator on the same site, it can be advantageous to provide a premix comprising quicklime and at least said first additive which can possibly comprise sodium or said first additive and a second additive comprising sodium. Such a premix can be provided to the hydrator for slaking in the process of manufacturing the sorbent according to the present invention. In this case, fresh sorbent according to the invention can be manufactured on site just before its use in the flue gas treatment process.

The premix can be introduced into a hydrator, for example in a single stage hydrator and hydrated with water with an amount of water leading to carried moisture of the raw hydrate ranging between 2 and 30 weight %, preferably between 5 and 25 weight % and most preferably between 10 and 15 weight % with respect to the total weight of said raw hydrate. The water/solid ratio can be varied depending on the targeted moisture of the product at the outlet of the hydrator.

Preferably, the said premix comprises at least 50 weight % of quicklime, preferably at least 70 weight % of quicklime, more preferably at least 80 weight % of quicklime and at least 0.7 weight % and at most 10 weight % of silicon, aluminum, or a combination thereof with respect to the total weight of said premix under a dry form.

Preferably the said premix further comprises a second compound comprising sodium or the first additive further comprises sodium.

Preferably, the molar ratio between the silicon or the aluminum or the combination thereof relative to sodium is comprised between 0.4 and 20, preferably 0.5 and 20.

For installations comprising a circulating dry scrubber device without any hydrator on the same site, the sorbent according to the present invention is manufactured at another site according to the process of manufacturing of the present invention and is provided for use in the flue gases treatment process according to the invention.

EXAMPLES

Comparatives samples of hydrated lime and samples of the sorbent according to the present invention have been tested separately in a first CDS pilot unit.

The comparative samples of hydrated lime have been produced by a slaking mode in a dry route as defined above, in which milled quicklime is hydrated in a single stage hydrator with an adapted amount of water to produce a raw hydrate with a targeted moisture below 2% when exiting the hydrator. The raw hydrate obtained is then classified, giving a coarse fraction and a natural fine fraction. The coarse fraction from this classification is milled with a ball mill and joined with the natural fine fraction in the finished product silo.

The CDS pilot unit comprises three main units connected together: a reactor, a filter means and a mixing zone. The reactor is a Venturi reactor and comprises a vertical tube forming an inner cylinder (~7 m long, 4 cm diameter) which is externally enveloped by a concentric tube for the upper half forming the external cylinder.

A synthetic gas flow containing acid gas ($N_2$, $O_2$, $H_2O$, $CO_2$, $SO_2$) (20-30 $Nm^3/h$) enters the reactor from the bottom of the inner cylinder, goes up and, reaching the top, comes down in the external cylinder and then enters a Fabric Filter. The temperature of the synthetic gas flow is set at 130° C.

The injection of fresh hydrated lime and recycled material takes place at the bottom of the reactor by a reinjection screw. The range of injection rates are respectively 0 to 200 g/h for the fresh sorbent and 0 to 2000 g/h for the recycled material. Those solids particles are entrained by the gas flow to the fabric filter. The fabric filter (filter means) separates the residues formed by the freshly converted hydrated lime and the recycled material from the treated gas.

The solid residues are then sent to a hopper before conditioning and reinjected in the system via a Conditioning Drum (mixing zone). In the conditioning drum, a given quantity of water is thoroughly mixed with the recycled material. The water content carried by the recycled material can vary from 0.1 weight % up to 25 weight % with respect to the total weight of the sorbent under a dry form.

Table 1 presents four premix compositions and the compositions of the starting materials for preparing those premix compositions. All the premix compositions of table 1 are prepared starting from quicklime and from a first additive which is a compound comprising silicon and sodium, namely $Na_2SiO_3 \cdot 5H_2O$.

TABLE 1

|  |  | Premix 1 | Premix 2 | Premix 3 | Premix 4 |
|---|---|---|---|---|---|
| Quicklime | Quicklime source | Quicklime 1 | Quicklime 2 | Quicklime 3 | Quicklime 3 |
|  | Available CaO in quicklime (weight %) | 93.2 | 92.9 | 93.0 | 93.0 |
| First additive | First additive | Na metasilicate pentahydrated ($Na_2SiO_3 \cdot 5H_2O$) | | | |
|  | Weight % Si in First additive | 13.2 | 13.2 | 13.2 | 13.2 |
| Composition Premix | Theoretical molar ratio Si/Ca | 0.03 | 0.03 | 0.05 | 0.20 |
|  | Weight % quicklime in premix | 89.7 | 89.7 | 84.0 | 56.7 |
|  | Weight % first additive in premix | 10.3 | 10.3 | 16.0 | 43.3 |
|  | Weight % CaO* | 83.6 | 83.4 | 78.1 | 52.7 |
|  | Weight % $SiO_2$* | 2.9 | 2.9 | 4.5 | 12.1 |
|  | Weight % $Na_2O$* | 3.0 | 3.0 | 4.6 | 12.6 |
|  | Weight % others* (unburned ($CaCO_3$), water in metasilicate, impurities . . . ) | 10.5 | 10.7 | 12.8 | 22.6 |
|  | Weight % Si* | 1.3 | 1.3 | 2.1 | 5.7 |
|  | Weight % Na* | 2.2 | 2.2 | 3.5 | 9.3 |
|  | Si/Na (mol)* | 0.5 | 0.5 | 0.5 | 0.5 |

*calculated values from quicklime and first additive weight % in Premix

The conditions of slaking of those premixes are detailed here below and the compositions and properties of the sorbents obtained from the slaking of those premixes are presented in table 2. The premix is manufactured in such a way that the molar ratio between Si and Ca (Si/Ca) is comprised between 0.02 and 0.2 and is calculated according to the following formulae:

$$Si/Ca(mol) = \frac{w_{Si source} \times \% \ SiO2_{Si source} \times M_{CaO}}{100 \times M_{SiO2} \times w_{QL}}$$

Wherein;

$w_{Si\ Source}$ represents the weight of the first additive which is a compound comprising silicon;

% $SiO_2$ $_{Si\ Source}$ represents the % $SiO_2$ in the said first additive;

$M_{CaO}$ represents the molar weight of CaO, i.e. 56.1 g/mol $M_{SiO2}$ represents the molar weight of $SiO_2$, i.e. 60.0 g/mol $w_{QL}$ represents the weight of quicklime used in the premix in the approximation that quicklime is only made of CaO while it is not the case in reality as aforementioned. Therefore, if the quicklime contains naturally $SiO_2$, the actual molar ratio Si/Ca in the product will be larger than the expected one. This is the case of the quicklime 2 that contains about 0.7% $SiO_2$.

Example 1.—Slaking of Premix 1

The Premix 1 was introduced in a laboratory scale hydrator with a feeding rate of 223 g/min. Water (at room temperature) was also introduced in this reactor with a flow of 200 g/min. No additional additive was used during the slaking. Both the Premix and the water were fed into the reactor at the same point (first third of the reactor length) and they were mixed and slaked before going out of the reactor after a retention time in the reactor close to 25 minutes. At the outlet of the hydrator, the moisture level carried by the lime based sorbent collected was 22.5 weight % with respect to the total weight of the raw hydrate. This sorbent has been further air classified and milled. For this purpose, a Hosokawa Alpine ATP 50-AFG 100 has been used. This equipment is a classification mill, using a jet mill to grind the particles down to the right size. The wet sorbent was introduced in this equipment, in which the rotation speed of the classification wheel was fixed at 2000 rpm and the pressure of the milling air was fixed at 3 bars. Due to contacts with large amount of ambient air, the moisture of the sorbent went down from 22.5 weight % to 18.1 weight % during the classification and milling step with respect to the total weight of the sorbent. The main properties of this obtained sorbent are presented in Table 2 (expressed on the total weight or mole of equivalent dry material except for the residual moisture being based on the sorbent weight).

Example 2.—Slaking of Premix 2

The Premix 2 was introduced in a pilot scale hydrator with a feeding rate of 150 kg/h. Water (at 12° C.) was also introduced in this reactor with an adapted amount of 134 l/h to target a residual moisture at the outlet of the hydrator comprised between 20 and 25 wt %. No additional additive was used during the slaking. Again, the Premix 2 and the water were mixed and slaked before going out of the reactor after a retention time in the reactor close to 25-30 minutes. At the outlet of the hydrator, the moisture level in the lime based sorbent collected was ranging between 21 and 22 weight % during a whole day of production with respect to the total weight of the raw hydrate. From the outlet of the hydrator, the lime based sorbent collected fall in a rubber jacket screw and was then de-agglomerated and partially dried by going through a Cage Mill (PSP MKS500) in which the sorbent came in contact with warm air leading to a flash drying of the particles. The air was heated by a gas burner which was set at its minimum level (42° C. only measured in the process filter located downstream the cage mill) in order to ensure an uncomplete drying only. The sorbent had a moisture ranging from 5 to 7 weight % with respect to the total weight of the sorbent during the whole production day. This product has been further air classified. For this purpose, a Hosokawa Alpine ATP 50-AFG 100 has been used at 177 rpm. The fines from this classification step were directly sent to the finished sorbent storage silo whereas the coarse fraction went through a pin mill before joining the fines in the finished sorbent silo. The main properties of the sorbent obtained are presented in Table 2 (expressed on the total weight or mole of equivalent dry material except the residual moisture being based on the weight of the sorbent).

Example 3.—Slaking of Premix 3

The Premix 3 has been introduced in the same laboratory scale hydrator as the one described in Example 1, but with a feeding rate of 238 g/min and with a flow of tap water (room temperature) of 204 g/min. At the outlet of the hydrator, the moisture level in the lime based sorbent collected was 20.7 weight % with respect to the total weight of the raw hydrate. In contrary to Examples 1 and 2, this product was neither flash dried nor classified nor milled in contrary to what was done in the examples 1 and 2. Only few grams of sample are dried in a thermoscale at 150° C. until constant weight in order to produce sufficiently dry material to conduct some analysis. The main properties of this obtained sorbent are presented in Table 2 (expressed on the total weight or mole of equivalent dry material except for the residual moisture being based on the sorbent weight).

Example 4.—Slaking of Premix 4

The same process as the one described in Example 3 has been applied, except that the Premix 4 was used, with a feeding rate of 351 g/min and with 156 g/min of water. As for example 3, these analysis have been conducted on few grams of product dried at 150° C. in a thermoscale until constant weight. The main properties of this obtained sorbent are presented in Table 2 (expressed on the total weight or mole of equivalent dry material except for the residual moisture being based on the sorbent weight).

TABLE 2

|  | Sorbent obtained from Example 1 | Sorbent obtained from Example 2 | Sorbent obtained from Example 3 | Sorbent obtained from Example 4 |
|---|---|---|---|---|
| Residual moisture (wt %) in sorbent, measured by weight loss at 150° C. until content weight | 18.1 | 5.9 | 20.7 | 20.6 |
| Wt % Ca(OH)$_2$ in sorbent, measured by TGA | 83.5 | 82.2 | 79.7 | 56.3 |
| Wt % CaCO$_3$ in sorbent, measured by TGA | 5.5 | 5.1 | 1.4 | 0.7 |
| Wt % Si in sorbent, measured by XRF | 1.1 | 1.5 | 1.7 | 4.8 |
| Wt % bound water in sorbent, measured by TGA | 2.0 | 2.0 | 2.1 | 4.7 |
| Wt % Na$_2$O in sorbent, measured by XRF | 2.3 | 1.9 | 3.2 | 11.1 |
| Si/Ca molar | 0.032 | 0.044 | 0.049 | 0.165 |
| Si/Na molar | 0.54 | 0.92 | 0.57 | 0.48 |
| Mol % of Ca not Ca(OH)$_2$ nor CaCO$_3$ in sorbent | 4.8 | 6.1 | 10.8 | 26.4 |
| BET Specific Surface Area (m$^2$/g) | 20.5 | 20.7 | 11.3 | 3.7 |
| BJH Pore volume (cm$^3$/g) | 0.104 | 0.088 | 0.067 | 0.015 |
| d$_{50}$ (μm) | 3.8 | 4.1 | 4.9 | 10.6 |
| d$_{90}$ (μm) | 25.5 | 22.8 | 32.0 | 70.9 |

Figure 3:
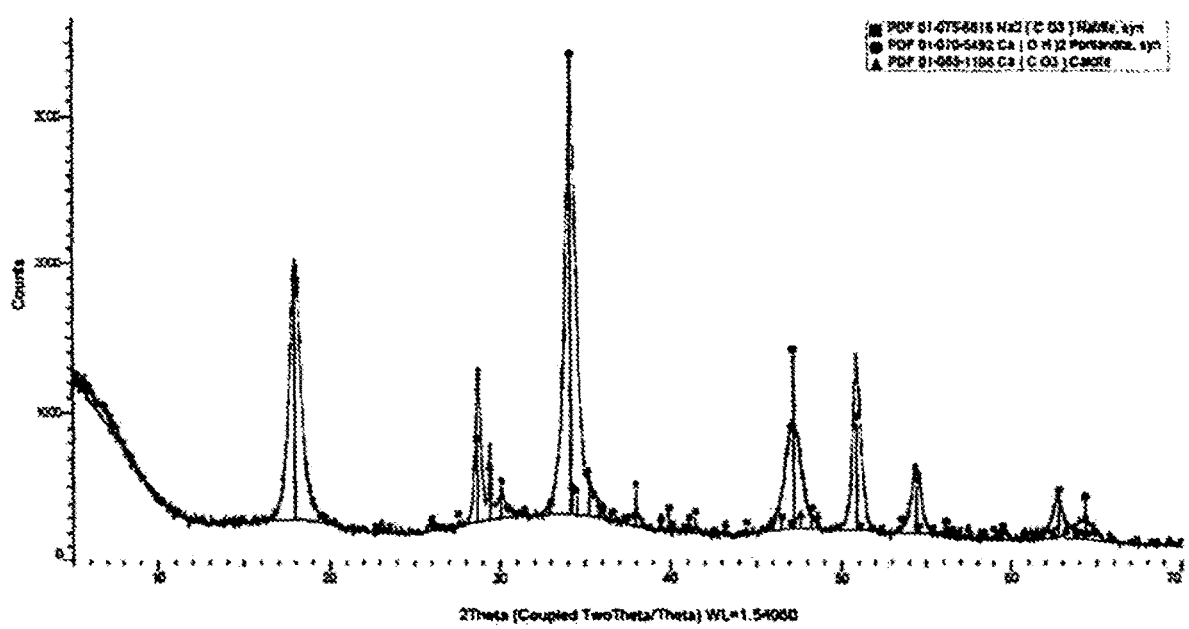
FIG. 3 shows a XRD pattern of a sample of a sorbent according to example 4 of the present invention.

The XRD pattern of the sample of the example 4 that has been dried at 150° C. is presented in FIG. 3 and shows that this material contains a large amount of amorphous phase, portlandite (Ca(OH)$_2$), calcite (unburned CaCO$_3$) and Natrite (Na$_2$CO$_3$). No crystalline calcium silicate nor remaining unreacted Na silicate is visible on this XRD pattern. There is therefore a remaining part of the calcium which is not under the form of Ca(OH)2, nor CaCO3 and it is assumed that the amount of CaO is not present in the sample after slaking of the premixes. This remaining part of calcium which is not under the form of Ca(OH)2 nor CaCO3 is determined by measuring the total amount of calcium by XRF and by subtracting from this amount the amount of calcium under the form of Ca(OH)2 and the amount of calcium under the form CaCO3 as described herein above.

Figure 4:
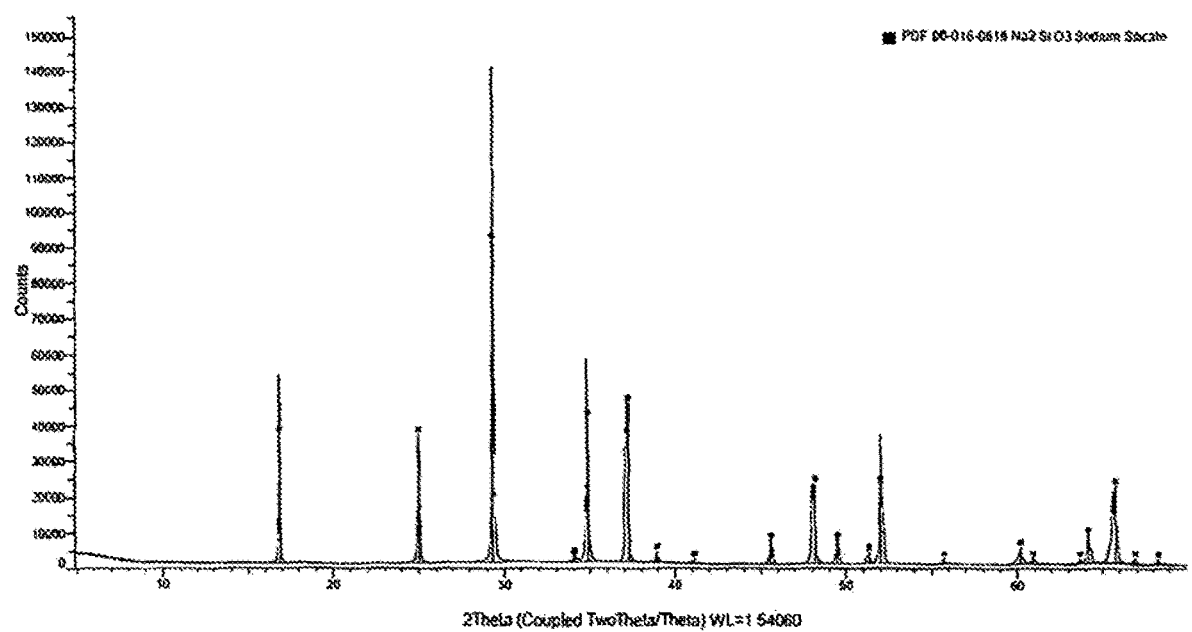
FIG. 4 shows a XRD pattern of a sample of a metasilicate in the same measurement condition than for the sample of sorbent of example 4 according to the XRF measurement of FIG. 3.

For comparison purposes, the XRD pattern of the sodium silicate pentahydrated that has been used as the compound comprising Si in this example is shown in FIG. 4. This sample has been dried at 150° C. before the XRD analysis in order to compare it with the product of the Example 4 which had been dried at this same temperature. The XRD pattern shows thus all the peaks of Na$_2$SiO$_3$ (anhydrous), which are however not visible on the XRD shown in FIG. 3, indicating thus that there is no remaining unreacted Na$_2$SiO$_3$ in the product prepared according to the Example 4.

Figures 5A, 5B:
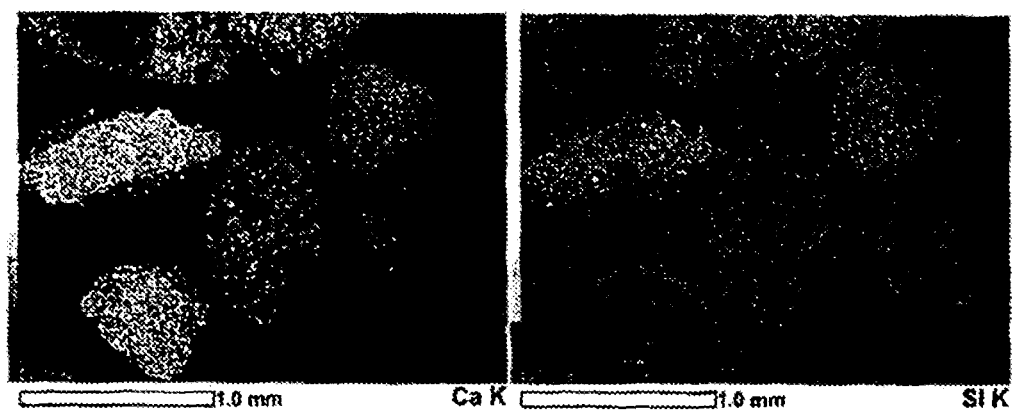
FIG. 5a presents the Si cartography of particles from a sample of sorbent according to an embodiment of the invention.
FIG. 5b presents the calcium cartography of particles from the same sample.

FIG. 5*a* presents the silicon cartography of particles from the sample produced in the example 4 and FIG. 5*b* presents the calcium cartography of particles from the same sample. It shows that this sorbent contains particles containing both significant amounts of Si and Ca.

Figure 6:
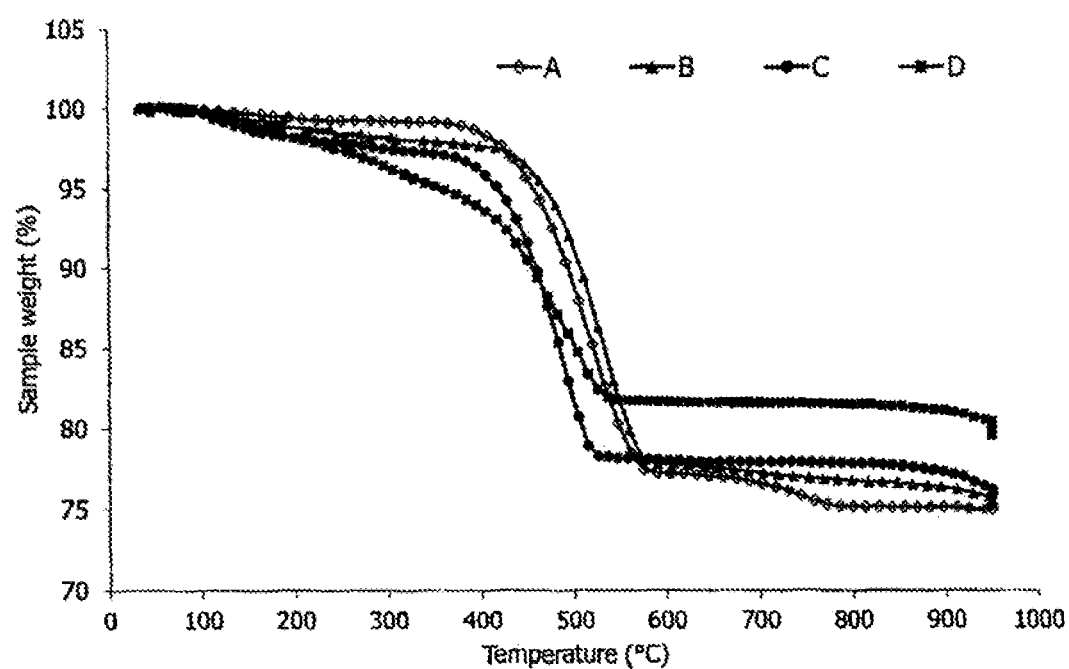
FIG. 6 presents a termogravimetric analysis (TGA) of the percentage of loss of weight of three samples of sorbents according to the present invention and of a hydrated lime as comparative example in function of the temperature.

FIG. 6 presents a termogravimetric analysis (TGA) of three samples of sorbent and a hydrated lime as comparative example (analysis done on samples previously dried at 150° C.):
- the curve A of white diamonds represents the TGA of hydrated lime without any additive (hydrate w/o any additional Si, Al or Na);
- the curve B of black triangles represents the TGA of the sorbent obtained from example 1 (Si/Ca=0.03);
- the curve C of black circles represents the TGA of the sorbent obtained from example 3 (Si/Ca=0.05); and
- the curve D of black squares represents the TGA of the sorbent obtained from example 4 (Si/Ca=0.20).

The loss of weight between 150° C. and 350° C. that is observed for the samples of example 1, 3 and 4 is attributed to the water bound to the sorbent according to the invention.

Example 5.—Test of Sorbent Obtained from Example 1

Figure 7:
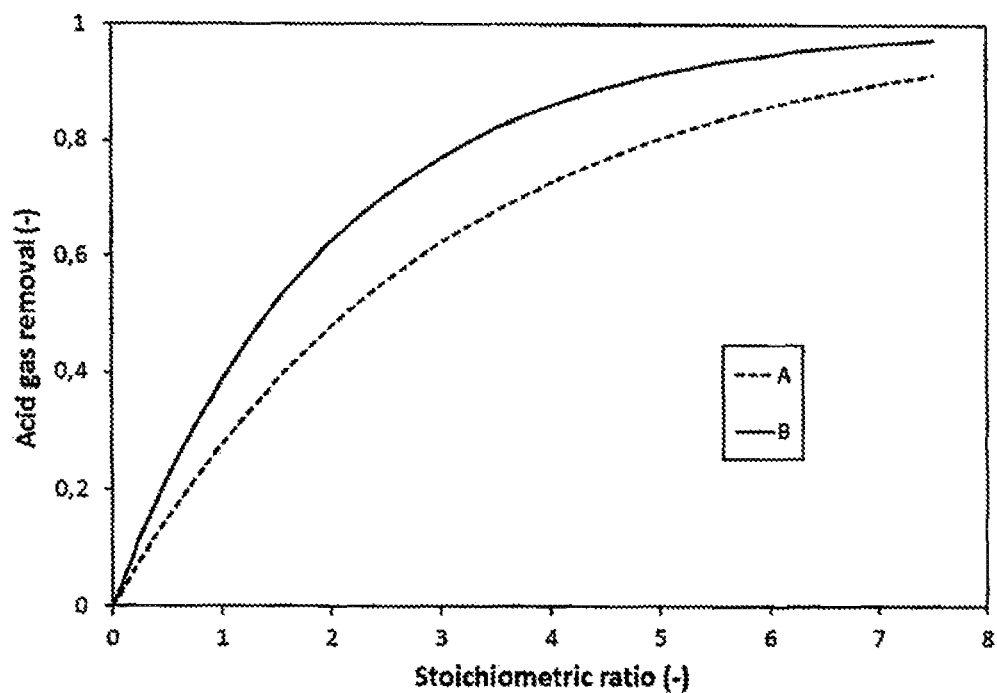
FIG. 7 shows two curves of the ratio of the content of $SO_2$ in a treated gas flow in a CDS pilot unit relative to the content of $SO_2$ set up initially in the synthetic gas flow in function of a molar ratio of calcium under any form relative to sulfur.
Figure 8:
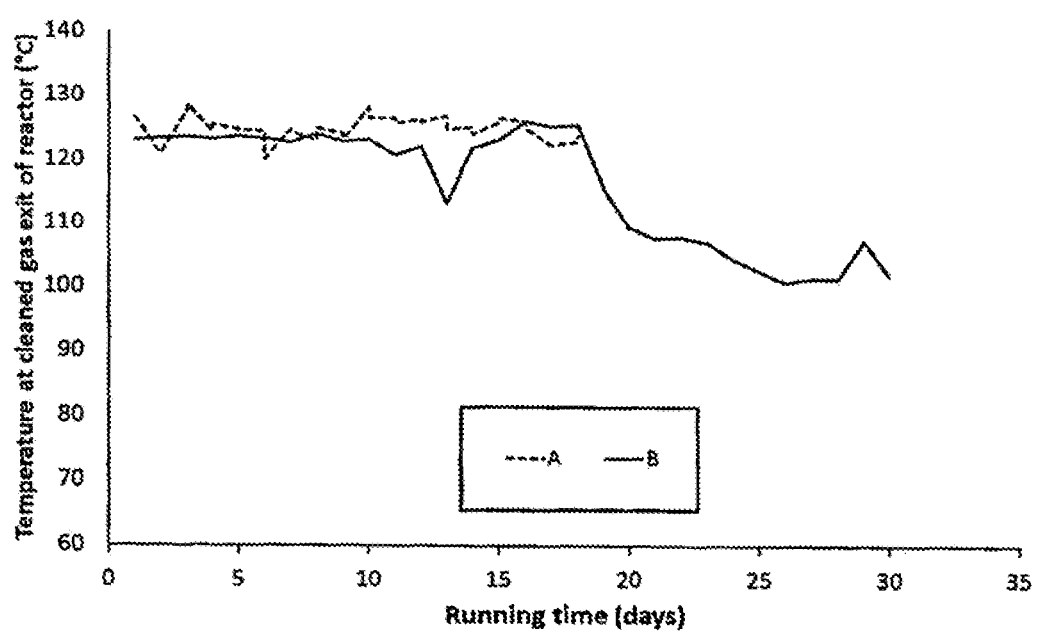
FIG. 8 presents the evolution of temperature at the top of the reactor in function of time for a sorbent according to the present invention and for a hydrated lime as comparative example.

2 kg of the fresh sorbent obtained from example 1 were loaded in the CDS pilot as synthesized to generate the residue. A fine dispersion of the sorbent was injected at the bottom of the reactor at a flow of 45 g/h. The synthetic gas flow rate in the process was 20.5 Nm$^3$/h, and its composition was gas and air mixture comprising 7.4% CO$_2$, 17.7% O$_2$, 8.2% H$_2$O and 500 ppm SO$_2$. All flows and concentrations are expressed on wet gas, the same applies for the following examples. The residue was filtered in a baghouse filter as filter means; the filter was automatically cleaned with air pulses when the pressure loss reached 15 mbar. The residue was then collected, and fell through a cascade of hoppers to reach a mixer as mixing zone, where it was added at a flow of 1000 g/h to be mixed with 50 mL/h of water to obtain a moisturization of 5%. This mixture was then reintroduced at the bottom of the reactor. The temperature at the top of the reactor (inside the reactor) has been measured in function of time as presented in FIG. 8 for the sorbent from example 1 according to the present invention (curve B) and compared to the comparative sample of hydrated lime produced (curve A) as explained above. The performance of SO$_2$ removal by the sorbent of example 1 was measured after stabilization of the composition of the residue. The moisturization was then increased to 20%, and the temperature and performance were measured after stabilization of the composition of the residue (sorbent according to the present invention). The performance of this sorbent (curve B) was compared with the comparative sample of hydrated lime moisturized at 5% (curve A) in the same conditions and temperature. The FIG. 7 shows two curves of the ratio of the content of SO$_2$ in the treated gas flow relative to the content of SO$_2$ in the synthetic gas flow in function of a molar ratio of calcium under any form relative to sulfur. The lower curve A shows the performance of SO$_2$ removal for the standard hydrate moisturized at 5% and the upper curve B shows the performance of the sorbent from example 1 moisturized at 20%.

Example 6: Test of Sorbent Obtained from Example 2

1.5 kg of the fresh sorbent obtained from example 2 was loaded in the first CDS pilot as described above to generate the residue. A fine dispersion of the sorbent was injected at the bottom of the reactor at a flow of 11 g/h. The synthetic gas flow rate in the process was 25.6 Nm$^3$/h, and its composition was a gas and air mixture comprising 6.1% CO$_2$, 18.3% O$_2$, 6.6% H$_2$O and 402 ppm SO$_2$. The temperature at the exit of the reactor was 117° C. The sorbent was filtered in a baghouse filter as filter means; the filter was automatically and continuously cleaned with air pulses. The residue was then collected, and fell through a cascade of hoppers to reach a mixer as mixing zone, where it was added at a flow of 1000 g/h to be mixed with 110 mL/h of water to obtain a moisturization carried by the residues of 11%. This mixture was then reintroduced at the bottom of the reactor. The flowability behavior of this sorbent was compared with a residue of hydrated lime moisturized at 5% in the same conditions: the comparison was made by measuring the Haussner ratio and Carr index at 1250 taps of each of the residues; results are given in table 3.

TABLE 3

| Sample | Haussner ratio [1250] | Carr index [1250] |
| --- | --- | --- |
| Product 1sorbent from Example 2 at 11 weight % wt of water out of the mixer | 1,317 | 24.1 |
| hydrated lime at 5 weight % wt of water out of the mixer (comparative example) | 1,410 | 29.1 |

The Haussner ratio and Carr index have been measured by a device GranuPack® from the company Granutools® being an entirely automated instrument that gives information on diffusion and percolation properties of granular materials. It measures the evolution of the tapped density versus a constant constraint. The measurements made by GranuPack consist to record the density of powders or granular materials after each individual tap.

The data analysis of the density curves gives multiple information about the studied granular material properties such as packing fraction, compaction, compressibility and release of the air trapped between the grains, granules or particles.

First, the measurement cell (glass cylinder from which the tare is known) is filled carefully in order to avoid compaction with 35 mL of a bulk powder. The cylinder is then weighted and the mass of sample is calculated by subtracting the tare of the empty glass cylinder. The weight of the sample divided by its initial volume (i.e. 35 ml) gives the bulk density of the product noted ρB (rhôB). The cylinder is then placed into the GranuPack and tapped 1250 times. The decrease of the volume occupied by the sample in the glass cylinder is recorded vs the number of taps.

At the end of the 1250 taps, the Tapped density noted ρT (rhôT) can be calculated by dividing the sample weight by the final volume recorded at the end of the measurement.

The Hausner ratio (H) can be calculated by dividing ρT by ρB.

The Carr Index (C) is calculated by the following formula:

$$H=100/(100-C).$$

The closer the Hausner ratio is to 1, the better the flowability of the powder. The smaller the Carr Index, (<15), the better the flowability.

Example 7: Test of Sorbent Obtained from Example 3

The same process that the one described in Example 5 has been applied, except that the sorbent from Example 3 was used. The synthetic gas flow rate in the process was 19.3 Nm$^3$/h, and its composition was a gas and air mixture comprising 7.8% $CO_2$, 17.4% $O_2$, 9.4% $H_2O$ and 498 ppm $SO_2$. The temperature at the top of the reactor was 116° C. The moisturization carried by the residue was 17.5%.

Example 8: Test of Sorbent Obtained from Example 4

The same process that the one described in Example 5 has been applied, except that the sorbent from Example 4 was used. The synthetic gas flow rate in the process was 19.5 Nm$^3$/h, and its composition was a gas and air mixture comprising 7.7% $CO_2$, 17.5% $O_2$, 9% $H_2O$ and 501 ppm $SO_2$. The temperature at the top of the reactor was 116° C. The moisturization carried by the residue was 17.5%.

All the sorbents obtained from examples 1 to 4 shows a better flowability than the comparative sorbent, especially at a moisture superior to 10% in the first CDS pilot.

Figure 9:
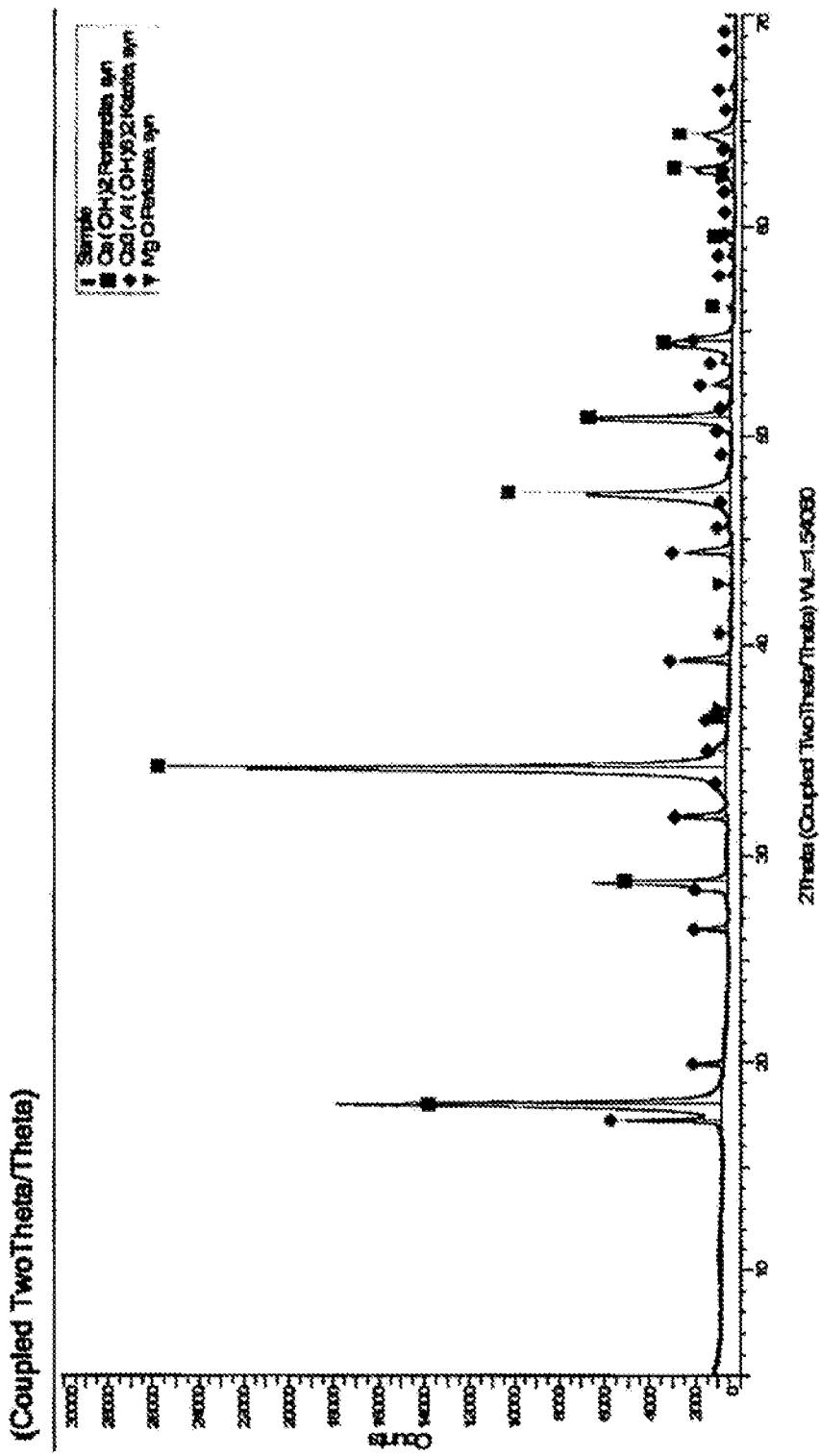
FIG. 9 presents an XRD pattern of a sample of a sorbent according to example 9 of the present invention.

Example 9: Manufacturing of a Lime Based Sorbent with Sodium Aluminate as a First Additive 30 kg of quicklime have been blended with 5023 g of solid Na aluminate ($NaAlO_2$) in a planetary mixer and this premix has been introduced in a powder feeder feeding a lab scale continuous hydrator. The feed rate of this solid blend has been set to 350 g/min and this solid blend was then slaked in a hydrator with a flow of water of 315 g/min. The moisture of the product at the exit of the hydrator was of 18.3 wt % and the product was dried to obtain a dry product with residual moisture of 1.7 w % measured by recording the weight loss of a sample in a thermoscale at 150° C. The composition of a dry sample of this product has been measured by XRF and corrected by the TGA measurements of the dried sample, and is presented in table 4. An XRD analysis of this product shows that a Ca aluminate, namely katoite has been formed during the synthesis (FIG. 9).

Example 10: Manufacturing of a Lime Based Sorbent with Waterglass as a First Additive 45 kg of quicklime have been introduced in a powder feeder feeding a lab scale continuous hydrator and its feed rate has been set to 300 g/min. In a small tank with a stirrer, 38490 g of water and 16064 g of waterglass have been mixed together. The waterglass used was supplied by Silmaco and contains 30.0 w % of $SiO_2$, 15.5 w % of $Na_2O$ and 54.5 w % of water. This solution made by diluting waterglass in water was fed into the hydrator to slake the quicklime with a flow rate of 363 g/min. The moisture of the product at the exit of the hydrator was of 21.0 w % and the product was dried to obtain a dry product with residual moisture of 1.1 w % measured by recording the weight loss of a sample in a thermoscale at 150° C. The composition of a sample of this product has been measured by XRF and corrected by the TGA measurements of the dried sample, and is presented in table 4.

Example 11: Manufacturing of a Lime Based Sorbent with Diatomeaceous Earth as a First Additive and Sodium Hydroxide as a Second Additive 30 kg of quicklime have been blended with 3672 g of diatomaceous earth (Célite™ S containing 82.3 w % $SiO_2$, 4.4 w % $Al_2O_3$ and 6.1 w % of water, as determined by XRF and calculated back by taking into account the moisture) in a planetary mixer and this premix has been introduced in a powder feeder feeding a lab scale continuous hydrator. The feed rate of this solid blend has been set to 337 g/min. In a small tank with a stirrer, 4282 g of NaOH have been dissolved in 31275 g of water and this solution was fed into the hydrator to slake the quicklime and diatomaceous earth blend with a flow rate of 356 g/min. The moisture of the product at the exit of the hydrator was of 20.7 w % and the product was dried to obtain a dry product with residual moisture of 2.2 w % measured by recording the weight loss of a sample in a thermoscale at 150° C. The composition of a sample of this product has been measured by XRF and corrected by the TGA measurements of the dried sample, and is presented in table 4.

Counter Example 12: Manufacturing of a Lime Based Product with Bentonite 20 kg of quicklime have been blended with 2149 g of bentonite (Ikomont RG supplied by S&B Industrial Minerals, Imerys Group containing 53.7 w % $SiO_2$, 20.3 w % $Al_2O_3$ and 8.6 w % water, as determined by XRF and calculated back by taking into account the moisture) in a planetary mixer and this premix has been introduced in a powder feeder feeding a lab scale continuous hydrator. The feed rate of this solid blend has been set to 221.5 g/min. This blend was hydrated with water with a flow rate of 128.5 g/min. The moisture of the product at the exit of the hydrator was of 3.8 w % measured by recording the weight loss of a sample in a thermoscale at 150° C. and the product was not further dried. The composition of a sample of this product has been measured by XRF and corrected by the TGA measurements of the dried sample, and is presented in table 4.

TABLE 4

| | Sorbent obtained from Example 9 (first additive sodium aluminate) | Sorbent obtained from Example 10 (first additive waterglass) | Sorbent obtained from Example 11 (first additive diatomaceous earth + second additive sodium hydroxide) | Product from counter example 12 (additive: bentonite) |
|---|---|---|---|---|
| Residual moisture (wt %) in sorbent | 1.7 | 1.1 | 2.2 | 3.8 |
| Wt % $Ca(OH)_2$ in sorbent measured by TGA | 76.0 | 69.8 | 70.4 | 88.0 |
| Wt % $CaCO_3$ in sorbent measured by TGA | 4.2 | 2.6 | 2.9 | 2.7 |
| Wt % Si in sorbent measured by XRF | 0.3 | 3.9 | 3.2 | 1.6 |
| Wt % of Al in sorbent measured by XRF | 3.5 | 0.1 | 0.3 | 0.7 |
| Wt % bound water in sorbent measured by TGA | 4.6 | 3.1 | 3.1 | 0.8 |
| Wt % $Na_2O$ in sorbent measured by XRF | 4.6 | 4.0 | 6.7 | 0.2 |
| Si/Ca molar | — | 0.12 | 0.10 | — |
| Si/Na molar | — | 1.1 | 0.5 | — |
| Al/Ca molar | 0.12 | — | — | — |
| Al/Na molar | 0.88 | — | — | — |
| (Si + Al)/Ca molar | — | — | 0.11 | 0.07 |
| (Si + Al)/Na molar | — | — | 0.6 | 16.8 |
| Mol % of Ca not in $Ca(OH)_2$ nor $CaCO_3$ | 4.9 | 16.7 | 13.0 | 0.6 |
| BET Specific Surface Area ($m^2/g$) | 10.7 | 15.2 | 8.7 | 12.7 |
| BJH Pore volume ($cm^3/g$) | 0.08 | 0.07 | 0.04 | 0.05 |
| $d_{50}$ (μm) | 7.0 | 10.8 | 3.8 | 5.9 |
| $d_{90}$ (μm) | 42.5 | 154.0 | 32.7 | 47.2 |

Example 13: Study of the Conversion and Clogging of the Sorbent of Example 9 (Additive Sodium Aluminate) in the Pilot Unit The general procedure for studying the conversion of the fresh sorbent into residue is described herein. An air and gas mixture (herein after called synthetic gas) containing 3 to 3.5 g/$Nm^3$ of SO2 and 8 to 10% of water vapor is injected into the first CDS pilot already described herein above. The synthetic gas flow rate is regulated at about 25 $Nm^3$/h with a temperature regulated to 100° C. at the filter inlet. 4 kg of fresh sorbent is loaded into the pilot directly through the reinjection screw. When the loading is achieved, the recirculation of the sorbent into the CDS pilot is started with a moisturization rate of 10%. The composition of the residue is measured every day by taking a sample of residue from the CDS pilot and measuring the available lime content according to the normal standard EN 459-2. When the amount of Ca(OH)2 in the residue has decreased to 20 w % of the residue, CO2 is added to the synthetic gas to have a CO2 content of 6 to 7% in the synthetic gas. The conversion of sorbent into residue is considered achieved when the amount of Ca(OH)2 in the residue is lower than 10 w %.

Then the SO2 and CO2 injection is stopped and a general procedure for studying the dclogging phenomena in function of the moisturization rate is started. The moisturization rate is increased by 2%, the residue is continuously recirculated into the CDS pilot and after minimum 3 hours, the humidity of the residue is measured by thermogravimetric analysis and the moisturization rate is set 2% higher. Gradual increasing of the moisturization rate and measurement of the humidity of the residues are repeated at different times while keeping the residues circulating into the CDS pilot, until a failing point is reached wherein it is not possible anymore to handle the residue in the CDS pilot, with typically big stones being formed in the pilot or problems of sticking of the residue to the walls of the pilot and/or to the reinjection screw are observed.

According to the general procedures described above, 4 kg of the fresh sorbent manufactured according to the example 9 is loaded in the CDS pilot to generate the residue. The fresh sorbent is directly injected at the bottom of the reactor by the reinjection screw. The synthetic gas flow rate in the process was 24.0 Nm$^3$/h, and its composition is an air and gas mixture comprising 19.2% $O_2$, 8.7% $H_2O$ and 1196 ppm $SO_2$. The residue is filtered in a baghouse filter as filter means; the filter is automatically cleaned with air pulses when the pressure loss reaches 6 mbar. The residue is then collected, and falls through a cascade of hoppers to reach a mixer as mixing zone, where it is added at a flow of 2500 g/h to be mixed with 250 mL/h of water to obtain a moisturization of 10%. This mixture is then reintroduced at the bottom of the reactor through the reinjection screw. After 5 hours, the recirculation flow is set at 4000 g/h, to be mixed with 400 mL/h of water to keep a moisturization of 10%. After 20 hours, $CO_2$ is injected at the bottom of the reactor such that the synthetic gas comprises 6% $CO_2$, 17.8% $O_2$, 9.0% $H_2O$ and 1201 ppm $SO_2$. The performance of $SO_2$ removal is measured at the end of each operating day. After 26 hours, the moisturization rate is fixed at 12% and the $SO_2$ injection is stopped to achieve a syntetic gas composition comprising 6% $CO_2$, 17.8% $O_2$ and 9.3% $H_2O$. After 30 hours, the moisturization rate is fixed at 14% and the $CO_2$ injection was stopped to achieve a synthetic gas composition comprising 19.1% $O_2$ and 9.2% $H_2O$. The moisturization is then increased by 2% every 3 to 4 hours to reach 24%.

Example 14: Study of the Conversion and Clogging of the Sorbent (Additive Waterglass) of Example 10 in the Pilot Unit According to the general procedure for studying the conversion of fresh sorbent into residue and to the general procedure for studying the clogging phenomena in function of the moisturization rate as described for example 13, the same procedures are applied for a fresh sorbent manufactured according to example 10. An amount of 4 kg of the fresh sorbent according to example 10 is loaded in the CDS. The sorbent is directly injected at the bottom of the reactor by the reinjection screw. The synthetic gas flow rate in the process was 24.6 Nm$^3$/h, and its composition is an air and gas mixture comprising 19.2% O2, 8.6% H2O and 1206 ppm SO2. The residue is filtered in a baghouse filter as filter means; the filter is automatically cleaned with air pulses when the pressure loss reaches 6 mbar. The residue is then collected, and falls through a cascade of hoppers to reach a mixer as mixing zone, where it is added at a flow of 2500 g/h to be mixed with 250 mL/h of water to obtain a moisturization of 10%. This mixture is then reintroduced at the bottom of the reactor. After 7 hours, the recirculation flow is set at 4000 g/h, to be mixed with 400 mL/h of water to keep a moisturization of 10%. After 18 hours, CO2 is injected at the bottom of the reactor such that the synthetic gas composition comprises 5.6% CO2, 18% O2, 8.6% H2O and 1106 ppm SO2. The performance of SO2 removal is measured at the end of each operating day. After 28 hours, the moisturization rate is fixed at 12% by increasing the addition of water and the SO2 and CO2 injections are stopped to achieve a synthetic gas composition comprising 19.2% O2 and 8.6% H2O. The moisturization rate is then increased every 3 to 4 hours to reach 24%.

Example 15: Study of the Clogging of the Sorbent of Example 11 (Additive Diatomaceous Earth+Sodium Hydroxide) in the Pilot Unit According to the general procedure for studying the conversion of fresh sorbent into residue and to the general procedure for studying the clogging phenomena in function of the moisturization rate as described for example 13, and 14, the same procedures are applied for a fresh sorbent manufactured according to example 11. An amount of 4 kg of the fresh sorbent according to example 11 is loaded in the CDS pilot. The sorbent is directly injected at the bottom of the reactor by the reinjection screw. The synthetic gas flow rate in the process is 25.2 Nm$^3$/h, and its composition comprises 19.2% O2, 8.6% H2O and 1079 ppm SO2. The residue is filtered in a baghouse filter as filter means; the filter is automatically cleaned with air pulses when the pressure loss reaches 6 mbar. The residue is then collected, and falls through a cascade of hoppers to reach a mixer as mixing zone, where it is added at a flow of 2500 g/h to be mixed with 250 mL/h of water to obtain a moisturization of 10%. This mixture is then reintroduced at the bottom of the reactor. After 9 hours, the recirculation flow is set at 4000 g/h, to be mixed with 400 mL/h of water to keep a moisturization of 10%. After 23 hours, CO2 is injected at the bottom of the reactor to achieve a gas composition comprising 5.7% CO2, 17.9% O2, 9.0% H2O and 1119 ppm SO2. The performance of SO2 removal is measured at the end of each operating day. After 31 hours, the moisturization rate is fixed at 12% by increasing the addition of water and the SO2 and CO2 injections are stopped to achieve a gas composition comprising 19.1% O2 and 9.2% H2O.

Counter Example 16: Study of the Conversion of the Product of Counter Example 12 (Additive: Bentonite) in the Pilot Unit According to the general procedure for studying the conversion of fresh sorbent into residue and to the general procedure for studying the clogging phenomena in function of the moisturization rate as described for example 13, 14 and 15, the same procedures are applied for a fresh product manufactured according to example 12. An amount of 4 kg of the fresh product is loaded in the CDS pilot. The product is directly injected at the bottom of the reactor by the reinjection screw. The synthetic gas flow rate in the process is 24.9 Nm$^3$/h, and its composition comprises 19.2% O2, 8.8% H2O and 1122 ppm SO2. The residue is filtered in a baghouse filter as filter means. The filter is automatically cleaned with air pulses when the pressure loss reaches 6 mbar. The residue is then collected, and falls through a cascade of hoppers to reach a mixer as mixing zone, where it is added at a flow of 2500 g/h to be mixed with 250 mL/h of water to obtain a moisturization of 10%. This mixture is then reintroduced at the bottom of the reactor. After 8 hours, the recirculation flow is set at 4000 g/h, to be mixed with 400 mL/h of water to keep a moisturization of 10%. After 27 hours, CO2 is injected at the bottom of the reactor to achieve a gas composition comprising 6.3% CO2, 17.9% O2, 8.9% H2O and 1157 ppm SO2. The performance of SO2 removal is measured at the end of each operating day. After 30 hours, the operations is stopped due to the reactor clogging by the pelletized residue.

The sorbents manufactured according to examples 9, 10 and 11 according to the invention are successfully recirculated in the first CDS pilot without problems of clogging and for moisturization rates superior to 10% and up to 24%. The product manufactured according to the counter example 12 is not usable in CDS process because it failed to be recirculated in the first CDS pilot without problems of clogging before increasing the moisturization rate.

Example 17: Test of a Comparative Sorbent in a Bigger Scale CDS Pilot

A commercially available lime based sorbent has been tested at a second CDS pilot plant as a comparative example.

Figure 10:
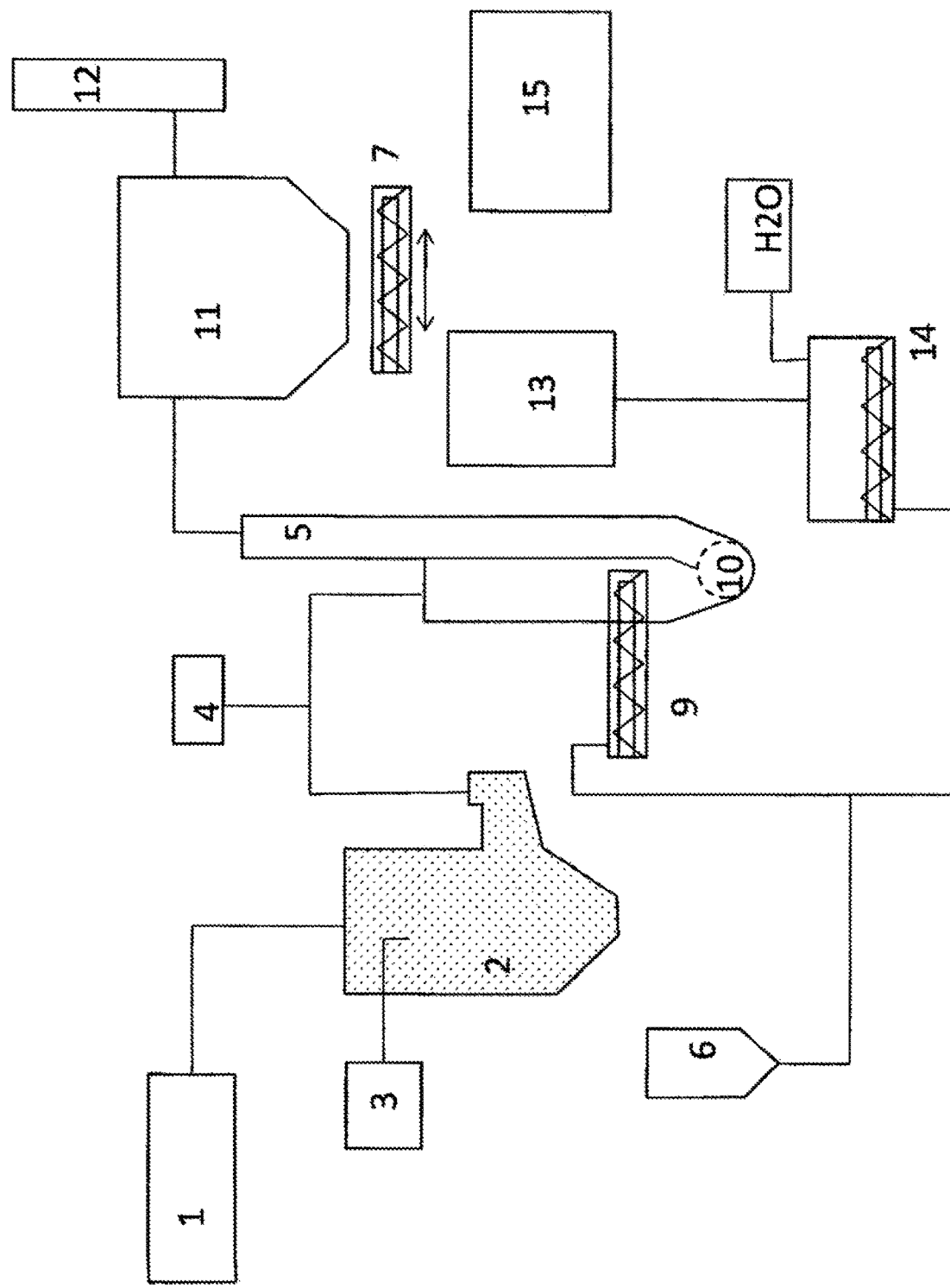
FIG. 10 presents a schematic view of a CDS pilot wherein samples according to the invention are tested.

The second CDS pilot plant is represented in FIG. 10 and comprises a gas burner 1 which generates a flow of gas that passes through a quench 2 to control humidity and temperature of the gas. An HCl injector 3 is arranged to inject HCl into the quench such as to generate a synthetic flue gas. After the quench 2, an SO2 injector 4 is arranged to inject SO2 in the pipeline so such as to also generate the synthetic flue gas. This flue gas is treated in a reactor 5 wherein fresh sorbent coming from a dosage unit 6, is injected via a screw 9. Then, the sorbent follows the gas path and goes through a ball mill 10 at the bottom part of the reactor 5. The residue is collected in a baghouse filter 11 whereas the clean flue gas goes through the stack 12. A bi-directional conveyor or screw 7 is located at the bottom of the baghouse filter 11 to convey a first part of the residue collected to a recycling system 13 and a second part to a product bin 15. The first part of residues collected is recirculated, after a humidification step in a shaft mixer 14, and injected at the same location as the fresh sorbent. The industrial CDS pilot can operate with a volume flow of gas comprised between 1000 and 2000 $Nm^3/h$, a raw gas temperature comprised between 70 and 200° C., a dew point temperature comprised between 30 and 60° C., a sorbent dosing unit able to provide between 25 kg/h of fresh sorbent, a recycling system able to recirculate 600 $g/Nm^3$ of wet material, and a water injection system providing 120 l/h to the mixer of the recycling system. Two infrared analyzers (not shown) are provided at the reactor inlet and downstream of the baghouse filter for monitoring the performance of SO2 removal.

The quench comprises a chamber with a flue gas inlet, a cooling water inlet and an evacuation duct towards the reactor. The amount of cooling water provided into the quench is optimized in function of the design of the quench, in function of the composition of the flue gas and its temperature at the entrance of the quench and in function of the temperature of the flue gas wished into the reactor. The lower the temperature is in the reactor, the better is the kinetics of reaction of the pollutants contained in flue gas reacts with the lime-based sorbent provided in the reactor. However, in order to prevent problems of corrosion in the CDS installation, it is important to control the flue gas temperature such that the temperature of the flue gas entering in the reactor is over the dew point of the acidic gas present as pollutant in the flue gas, generally at least 20° C. over said dew point. For example when SO2 is the main pollutant in the flue gas, it is preferable to set up the temperature of the flue gas entering into the baghouse filter over 80° C. When the flue gas further comprises HCl as pollutant, it is preferable to set up the temperature of the flue gas entering into the baghouse filter over 140° C., not only to prevent corrosion but also to prevent extensive formation of hydrated CaCl2 (CaCl2.nH2O) at lower temperatures which is hygroscopic and has a sticky behavior in the CDS installation. The temperature at the baghouse filter is derived from the cooling of the synthetic flow gas after its passage through the quench the reactor and the piping system.

The features of the comparative lime based sorbent are presented in table 5.

TABLE 5

| | |
|---|---|
| Moisture at 150° C. | 0.8 |
| Specific surface area ($m^2/g$) | 17.3 |
| Pore volume ($cm^3/g$) | 0.079 |
| D50 | 5.9 |
| D90 | 34.1 |
| D97 | 75.5 |
| Ca(OH)2 (w %) | 91.6 |
| SiO2 (wt %) | 0.22 |
| Na2O (wt %) | 0.03 |
| CaCO3 (wt %) | 4.4 |
| Wt % bound water in sorbent measured by TGA | 1.1 |
| Ca not under Ca(OH)2 nor CaCO3 | 3.5 |

The CDS pilot is operated with average synthetic gas flow rate of 1300 $Nm^3/h$ with an average content of SO2 before the reactor comprised between 800 and 1100 $mg/Nm^3$ and with an average content of CO2 close to 1% and H2O close to 8% (dew point=42° C.). A first step of conditioning the comparative sorbent into residue is performed by introducing an amount of 180 kg of comparative sorbent into the pilot, with 5 wt % of water added to the residue in the shaft mixer, with a temperature at the baghouse filter targeted to 105° C. and with an average flow rate of SO2 of 1050 $mg/Nm^3$. This sorbent is conditioned without fresh sorbent injection during a period of time enough such as the composition of the residue is stabilized. Then 3.6 kg/h of fresh comparative sorbent is injected in the CDS pilot during 4 days. Then the performance of the comparative sorbent is measured the following day with injection of fresh sorbent such as to have a normalized stoichiometric ratio of 2.1 expressed with regards to fresh sorbent, with a temperature of the baghouse filter targeted to 105° C. In those conditions, the SO2 abatement rate is of 84%. The following day, in the same conditions, but with a temperature of the baghouse filter targeted to 90° C., the SO2 abatement rate is of 93%. Then a further step of conditioning is performed by introducing 2.25 kg/h of fresh comparative sorbent in the CDS pilot during 3 days. The following day, the performance of the comparative sorbent is measured with a temperature at the baghouse filter targeted to 105° C. and with an injection of fresh sorbent such as to have a normalized stoichiometric ratio of 1.3 expressed with regards to the fresh sorbent. In those conditions, the SO2 abatement rate is of 78%. Then the performance of the comparative sorbent is measured in the same conditions but with a temperature at the baghouse filter targeted to 90° C. In those conditions, the SO2 abatement rate is of 83%. Then the amount of water added to the residue in the shaft mixer is increased from 5 wt % to 15 wt % and the recirculation of the residue is pursued as previously. After only 3 days, the CDS pilot is facing a major breakdown due to complete process clogging.

During the whole test described above, twice a day, a sample of dry residue is collected before the shaft mixer inlet and a sample of wet residue is collected after the shaft mixer. Moisture of the samples is measured by thermogravimetric analysis and the chemical composition is measured by a CHNS elemental analyzer (Flash 200 from Thermo instruments) and the available lime content is determined by titration according to the EN 459-2 standard. Those analytical data allow calculating lime conversion, Stoichiometric Factor (ratio of calcium injected over adds effectively removed by the lime) and selectivity for sulfur and carbon ($SO_2$, $CO_2$) of the reaction occurring between the sorbent and the gas. Furthermore, those analytical data allow to assess the total weight of $Ca(OH)_2$, $CaCO_3$ and $CaSO_x$ recycled in the system using the residue composition and the flow of recycled material.

Example 18: Process of Manufacturing of a Lime Based Sorbent with Na Metasilicate as Additive and Test of Such Obtained Sorbent in a Bigger Scale CDS Pilot The product manufactured according to example 2 has been tested in the same CDS pilot as described in example 17.

The CDS pilot is operated with average synthetic gas flow rate of 1300 $Nm^3$/h with an average content of SO02 before the reactor comprised between 900 and 1100 mg/$Nm^3$ and with an average content of $CO_2$ close to 1% and $H_2O$ close to 8% (dew point=42° C.). A first step of conditioning the sorbent of example 2 into residue is performed by introducing an amount of 180 kg of the lime based sorbent of example 2, hereinafter named fresh sorbent of example 2, into the pilot with 5 wt % of water added to the residue in the shaft mixer, with a temperature at the baghouse filter targeted to 105° C. and with an average flow rate of $SO_2$ of 1050 mg/$Nm^3$. This sorbent is conditioned without fresh sorbent injection during a period of time enough such as the composition of the residue is stabilized. The following day, fresh sorbent of example 2 is injected such as to have a normalized stoichiometric ratio of 2.1 expressed with regards to the fresh sorbent of example 2, with a temperature at the baghouse filter targeted to 105° C. In those conditions, the $SO_2$ abatement rate is of 87%. The following day, in the same condition but with the temperature of the baghouse filter targeted to 90° C., the $SO_2$ abatement rate is of 95%. Then the day after, fresh sorbent of example 2 is injected such that to have normalized stoichiometric ratio of 1.3 and after 7 days of recirculation of the residue, the amount of water added to the residue in the shaft mixer is increased from 5 wt % to 15 wt % and the recirculation of the residue is pursued as previously. The residue of the sorbent of example 2 can be run in the CDS pilot with such high moisture for 3.5 weeks without any major problem. Neither sticky behavior, nor pasty phenomena is observed. The performance is measured in conditions wherein the temperature of the baghouse filter is set to 90° C. and for two normalized stoichiometric ratios. At a targeted normalized stoichiometric ratio of 1.3, the $SO_2$ abatement rate is of 90% and at a targeted normalized stoichiometric ratio of 2.1, the $SO_2$ abatement rate is of 97%. Then the amount of water added to the residue in the shaft mixer is increased from 15 wt % to 20 wt % and the recirculation of the residue is pursued as previously. The residue of the sorbent of example 2 can be run in the CDS pilot with such high moisture for 10 days without sticky behavior nor pasty phenomena observed.

It is observed that up to 20% less sorbent of example 2 compared to the comparative sorbent of example 17 is needed at a targeted temperature at the baghouse filter targeted to 90° C. and with 5 wt % of moisture added to the residue in the shaft mixture for the same performance. It is also observed that the sorbent of example 2 performs better at higher moisture superior to 10% without problems of sticking or clogging contrary to the comparative sorbent of example 17 in the same conditions.

It should be understood that the present invention is not limited to the described embodiments and that variations can be applied without going outside of the scope of the appended claims.

The sorbent according to the present invention can be advantageously used in circulating dry scrubber for a flue gas treatment process.

Example 19: Process of Manufacturing of a Lime Based Sorbent with Na Metasilicate as Additive and Test of Such Obtained Sorbent in a Bigger Scale CDS Pilot A Premix very similar to the one used in Example 2, prepared with the same additive in the same amount but with a quicklime from another production site was slaked in the same pilot scale hydrator than the one described in Example 2 (single stage hydrator) with a feeding rate of 150 kg/h. Water (at 12° C.) was also introduced in this reactor with an adapted amount of 76-82 l/h to target a residual moisture at the outlet of the hydrator inferior to 2 wt %. No additional additive was used during the slaking. Again, the Premix and the water were mixed and slaked before going out of the reactor after a retention time in the reactor close to 25-30 minutes. At the outlet of the hydrator, the moisture level in the lime based sorbent collected was ranging between 1.5 and 3.5 weight % during a whole day of production with respect to the total weight of the raw hydrate. From the outlet of the hydrator, the lime based sorbent collected fall in a rubber jacket screw and was then de-agglomerated and partially dried by going through a Cage Mill (PSP MKS500) in which the sorbent came in contact with warm air leading to a flash drying of the particles. The air was heated at 120° C. The final sorbent had a moisture ranging from 0.1 to 1.0 weight % with respect to the total weight of the sorbent during the whole production day. This product has been further air classified. The fines from this classification step were directly sent to the finished sorbent storage silo whereas the coarse fraction went through a pin mill before joining the fines in the finished sorbent silo. Based on past experience, it is known that this process, i.e. working in this specific single stage pilot hydrator with 1.5-3.5% moisture at the outlet of the hydrator and drying the product, represents well an industrial dry hydration process, in which the quicklime would be hydrated in a multi stage (typically a three stage hydrator) and will come out of the reactor with a moisture below 2%, even below 1% and would simply be classified and milled without any drying step. Typical properties measured on one sample during the production of this material are presented in Table 6. This sorbent is hereinafter named sorbent of example 19.

TABLE 6

|  | Product from Example 19 |
|---|---|
| Residual moisture (wt %) | 0.4 |
| Wt % $Ca(OH)_2$ | 82-84 |
| Wt % $CaCO_3$ | 4.5-6.5 |
| Wt % Si | 1.3-1.5 |
| Wt % bound water | 1.3-2.3 |
| Wt % $Na_2O$ | 2.4-2.7 |
| Si/Ca molar | 0.03-0.04 |

TABLE 6-continued

| | Product from Example 19 |
|---|---|
| Si/Na molar | 0.6-0.7 |
| Mol % of Ca not in Ca(OH)$_2$ nor CaO nor CaCO$_3$ | 2-8 |
| BET Specific Surface Area (m$^2$/g) | 7.0-8.3 |
| BJH Pore volume (cm$^3$/g) | 0.03-0.04 |
| d$_{50}$ (μm) | 3-4 |
| d$_{90}$ (μm) | 14-22 |

The product manufactured according to example 19 has been tested in the same CDS pilot as described in example 17 and 18.

The CDS pilot is operated with average synthetic gas flow rate of 1300 Nm$^3$/h with an average content of SO2 before the reactor around 2000 mg/Nm$^3$ and with an average content of CO2 close to 1% and H2O close to 8% (dew point=42° C.). A first step of conditioning the sorbent of example 19 into residue is performed by introducing an amount of 180 kg of the lime based sorbent of example 2, hereinafter named fresh sorbent of example 2, into the pilot with 10 wt % of water added to the residue in the shaft mixer, with a temperature at the baghouse filter targeted to 105° C. This sorbent is conditioned without fresh sorbent injection during a period of time enough such as the composition of the residue is stabilized. The following day, fresh sorbent of example 19 is injected such as to have a targeted normalized stoichiometric ratio ranging between 1.8 and 1.3 expressed with regards to the fresh sorbent of example 19, with a temperature at the baghouse filter targeted to 105° C. The SO02 concentration in the synthetic flow gas is decreased to 1500 mg/Nm$^3$. After stabilization of the composition, the normalized stoichiometric ratio is kept at 1.3 expressed with regards to the fresh sorbent of example 19 and the water added to the residue in the shaft mixer is raised from 10 wt % to 15 wt %. In those conditions, the SO2 abatement rate is of 85% over a period of 7 days. After then, in the same condition but with the temperature of the baghouse filter targeted to 90° C., the SO2 abatement rate is of 87%.

Example 20: Test of Sorbent of Example 19 in a Bigger Scale CDS Pilot in Presence of SO2 and HCl.

The product manufactured according to example 19 has been tested in the same CDS pilot as described in example 17 to 19.

The CDS pilot is operated with average synthetic gas flow rate of 1300 Nm$^3$/h with an average content of SO2 before the reactor around 500 mg/Nm$^3$, an average content of HCl before the reactor around 1000 mg/Nm$^3$ and with an average content of CO2 close to 1% and H2O close to 8% (dew point=42° C.). The targeted normalized stoichiometric ratio is ranging between 1.3 to 1.5. A first step of conditioning the sorbent of example 19 into residue is performed by introducing an amount of 180 kg of the lime based sorbent of example 19, hereinafter named fresh sorbent of example 19, into the pilot with an amount of water ranging between 7.5 and 12 wt % added to the residue in the shaft mixer, with a temperature at the baghouse filter targeted in a range comprised between 120° C. and 140° C. In these conditions, the residue is recirculated in the CDS pilot without any problem of clogging which is largely unexpected for lime based sorbents.

The present invention is also related to a process for flue gas treatment using a circulating dry scrubber installation wherein
  i) a stream of flue gas comprising an acid gas pollutant is injected into a reactor with a temperature comprised between 120° C. and 250° C.;
  ii) a fresh sorbent as described hereinabove
    is injected into said reactor to react with said stream of flue gas to form residues and a stream of gas depleted in pollutants with a normalized stoichiometric ratio NSR comprised between 1 and 2.5, the normalized stoichiometric ratio being defined by the equation NSR=(Ca/N*P)
      wherein Ca is the number of moles of Ca(OH)2 of the said fresh sorbent injected in the reactor,
      P is the number of moles of pollutant from the said flue gas and;
      N is the stoichiometric number of moles of pollutants that can react with Ca(OH)2 according to the theoretical chemical reaction to completely convert one mole of a Ca(OH)2;
  iii) said stream of gas depleted of pollutants and residues are directed towards a filter unit which separates said stream of gas depleted in pollutants from the residues;
  iv) said residues are collected by a recycling system to be sent back to the reactor
  v) said residues are conditioned with water;
and wherein the amount of water used for conditioning said residues is superior to 10 w % of the circulating dry mass of residues when the raw gas contents less than 50 mg/Nm$^3$ of HCl and the amount of water used for conditioning said residues is superior to 3 w % preferably, superior to 5 w % of the dry circulating mass of residues when the raw gas contents more than 50 mg/Nm$^3$ of HCl, and is optimized to cool the said flue gas in the said reactor by evaporation of water from the said conditioned residues such that the said gas depleted of pollutants leaves the said reactor with a temperature decreased of at least 20° C., preferably at least 30° C., preferably at least 40° C., more preferably at least 50° C., in a range of temperatures inferior to 200° C. and superior of 20° C. to the acid dew point of the said acid pollutant in the said flue gas.

Preferably, during the process of flue gas treatment,
  the composition of the flue gas and of the gas depleted in pollutant is monitored;
  the volume of sorbent including fresh sorbent or residues or a combination thereof circulating in the said circulating dry scrubber is fixed;
  the performance of removal of pollutants is evaluated and;
  in case of decrease of the said performance, the amount of said water for conditioning the said residue is increased to a maximum of 20 w % of the dry circulating mass of residues or alternatively, in case of decrease of the said performance, an amount of fresh sorbent is injected in the said circulating dry scrubber installation and preferably an equivalent amount of circulating residue is removed.

The invention claimed is:
1. Process for manufacturing a circulating dry scrubber lime based sorbent composition comprising the steps of:
  providing quicklime and water in an hydrator;
  slaking said quicklime in a slaking step via a non-wet route in the hydrator;

collecting a lime based sorbent at an exit of the hydrator, the lime based sorbent being a composition wherein said, sorbent composition comprises 1 to 12 weight % of bound water with respect to the total weight of said sorbent under a dry form and;

wherein said process comprises a further step of adding at least a first additive comprising a silicon compound, said silicon compound being selected from the group consisting of silicates, silicates of sodium, metasilicates, metasilicates of sodium, kieselguhr, diatomite, precipitated silica, silica fume, rice husk ash, silicic acid, amorphous silica, and combinations thereof, and/or;

a compound comprising aluminum selected from the group consisting of aluminum trihydroxide, boehmite, and combinations thereof, and/or;

a compound comprising silicon and aluminum selected from the group consisting of vermiculite, paper ash, and combinations thereof;

before or during said slaking step, at a molar ratio between silicon or aluminum or a combination thereof and the calcium provided to said hydrator equal to or below 0.2 and equal to or above 0.02.

2. Process according to claim 1, further comprising a step of drying said lime based sorbent or classifying said lime based sorbent or grinding said lime based sorbent or milling said lime based sorbent or a combination thereof.

3. Process according to claim 1, wherein said first additive is provided at least partially in a solution or in a suspension and added to said water.

4. Process according to claim 1, wherein said first additive is provided at least partially under solid form and added to said quicklime.

5. Process according to, claim 1 wherein said quicklime and said first additive are provided in a premix containing at least 50 weight % of quicklime and at least 0.7 weight % of silicon or aluminum or a combination thereof and at most 10 weight % of silicon or aluminum or a combination thereof with respect to said total weight of said premix under a dry form.

6. Process according to claim 1, wherein said first additive further comprises sodium.

7. Process according to claim 1, further comprising an additional step of adding a second additive comprising a compound comprising sodium.

8. Process according claim 7, wherein the said second additive comprising a compound comprising sodium is selected from the group consisting of sodium hydroxide, sodium carbonate, sodium hydrogenocarbonate, sodium nitrate, sodium phosphate, sodium persulfate or sodium acetate.

* * * * *